US006529958B1

(12) United States Patent
Oba et al.

(10) Patent No.: US 6,529,958 B1
(45) Date of Patent: Mar. 4, 2003

(54) LABEL SWITCHED PATH SET UP SCHEME WITH REDUCED NEED FOR LABEL SET UP RETRY OPERATION

(75) Inventors: Yoshihiro Oba, Tokyo (JP); Yasuhiro Katsube, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/356,054

(22) Filed: Jul. 16, 1999

(30) Foreign Application Priority Data

Jul. 17, 1998 (JP) .......................... 10-203667

(51) Int. Cl.[7] .............................. G06F 15/16
(52) U.S. Cl. ................... 709/237; 709/230; 709/234; 709/238; 709/240; 709/241; 709/242; 370/392; 370/396; 370/397
(58) Field of Search ..................... 709/230, 234, 709/237, 239, 238, 240, 241, 242; 370/392, 396, 397

(56) References Cited

U.S. PATENT DOCUMENTS 6,055,561 A * 4/2000 Feldman et al. ............ 709/200
6,130,889 A * 10/2000 Feldman et al. ............ 370/397
6,341,127 B1 * 1/2002 Katsube et al. ............ 370/352
6,205,488 B1 * 3/2002 Casey et al. ................ 709/238

OTHER PUBLICATIONS

Viswanathan et al., "ARIS : Aggregate Route–Based IP switching," Network Working Group Internet–Draft, pp. 1–19, Mar. 1997.*

Ohba et al., "MPLS Loop Prevention Mechanism", Network Working Group Internet–Draft, pp. 1–40, May, 1997.*

Doolan et al., "Tag Distribution Protocol ," Network Working Group Internet–Draft, pp. 1–40, May, 1997.*

Internet Article—"Routing Over Large Clouds Working Group", J.V. Luciani et al. (Feb. 6, 1998).

Y. Ohba, et al., "Multi–Protocol Label Switching WG", *MPLS Loop Prevent Mechanism Using LSP–id and Hop Count*, pp. 1–20, (Mar. 1998).

* cited by examiner

*Primary Examiner*—Thomas Lee
*Assistant Examiner*—Jinsong Hu
(74) *Attorney, Agent, or Firm*—Foley & Lardner

(57) ABSTRACT

A label switched path set up scheme which is capable of detecting a loop of the label switched path efficiently and quickly, and which can enable the switching of the label switched path even in the case where conventionally a label switch path loop would be erroneously detected at a time of the route change, without requiring a label set up retry operation from a previous hop node device of the node device that have erroneously detected the loop which would have been necessary conventionally. A label switched path set up request message is transferred up to a node that can confirm that the path does not form a loop, while each node through which the message passes stores the fact that it is in a message processing state. Then, in a process where a response message is returned from that node, the message processing state of each node on the route of the path is released sequentially, and this releasing establishes the path set up.

24 Claims, 13 Drawing Sheets

| R15's table |||| 
|---|---|---|---|
| input link (i/f:label) | flowid | ingress | output link (i/f:label) |
| I1415:x1415 | R16 | R11 | I1516:x1516 |

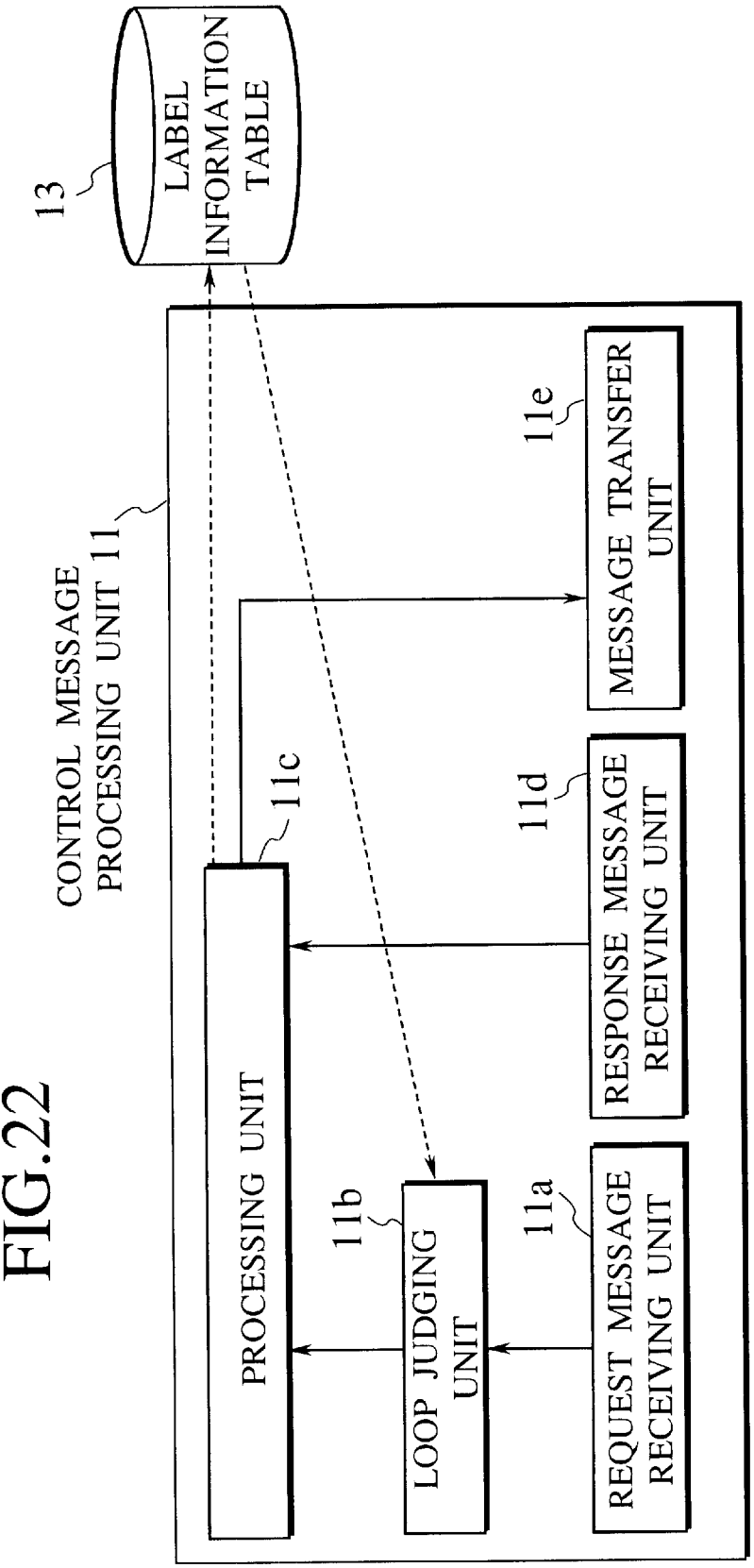

LABEL SWITCHED PATH SET UP SCHEME WITH REDUCED NEED FOR LABEL SET UP RETRY OPERATION

BACKGROUND OF THE INVENTION

1. Field of the Invention

The present invention relates to a node device having a label switching function and a method for setting up a label switched path.

2. Description of the Background Art

In a network layer protocol in which IP (Internet Protocol) nodes are inter-connected on a network, there is a scheme for realizing high speed packet transfer called MPLS (Multi-Protocol Label Switching).

In the MPLS, the label switching is carried out by allocating specific "labels" to specific packet flows between nodes and setting an input side label and an output side label in correspondence at each node, so that the IP processing can be omitted and a high speed packet transfer can be realized. For example, in the case where the link layer is ATM, VPI(Virtual Path Identifier)/VCI (Virtual Channel Identifier) will be used as a label. A route through which the packet flow is label switched is called a label switched path. In the following description, the label switched path will be referred to as simply as a path.

In the case of constructing the path, a label distribution protocol is used. The label distribution protocol exchanges control messages (path control messages) between nodes on a packet flow route in order to notify a correspondence between a flow identifier for identifying the packet flow in network global fashion and a label for identifying the packet flow in link local fashion.

In general, the path control message is transferred according to the layer 3 route information, but when the layer 3 route is looping, there are possibilities for the path control message to loop or a looping path to form.

In order to resolve this problem, there is a loop prevention method disclosed in "Internet-Draft, draft-ohba-mpls-loop-prevention-00.txt", in which the ingress node information is contained in the path control message and each node stores the ingress node address (ingress node information) and the hop count from the ingress node for each branch on the input side of the path, and notifies to the downstream side the ingress node information which has the largest hop count from the ingress node among all the stored ingress node information along with the largest hop count +1. In addition, in the case of adding a new branch on the input side of the current path, or in the case of updating the ingress node information or the hop count from the ingress node for the existing input side branch, if the same ingress node information is already registered for another input side branch with respect to the same flow, it is judged that a loop will be formed so that the addition/updating of the input side branch is not carried out.

This loop prevention method has an advantage over the path vector scheme (in which each node that forwards the path control message adds its own address to the label allocation message and it is judged as a loop is the received label allocation message has the own address already written therein) in that the message length becomes fixed regardless of the hop count.

However, this loop prevention method has the following problem at a time of the route change.

For instance, consider a case where a path through a sequence of node devices R11→R12→R13→R14→R15→R16 on the layer 3 route is formed as shown in FIG. 1.

In this case, each node device on the path stores a flow identifier (flowid), an input link information (input physical link information (input interface)+input label)) for identifying the path, and "R11" as the ingress node information. The input link information (input link) is an information set in correspondence to the output link information (output link) and used in the label switching, which is obtained from a label obtained from the link identifier and an information on a physical link that exchanged the message. The physical link information will be denoted as Iij (i: an upstream node number of the link, j: a downstream node number of the link), and the link will be denoted as "physical link information: label".

FIG. 2 shows the state of a flow table provided in the node device R15 in the case of the path shown in FIG. 1.

In this case, when the route change occurs at R12 and the next hop leading to Flowid=R16 is changed from R13 to R17, the label allocation release message (RELEASE message) specifying (flowid=R16, ingress=R11) is sent on the old route from R12, while the label allocation request message (SETUP message) specifying (flowid=R16, ingress=R11) is sent on the new route from R12.

Now, if the SETUP message reaches to R15 before the RELEASE message, another entry with flowid=R16 and ingress=R11 is already set in correspondence to the input link (I1516: x1516) when the SETUP message for the input link (I1715: x1715) is received, so that R15 judges that it is a loop even though it is actually not a loop.

As a result, the label allocation failure (SETUP_NACK) message will be returned from R15 to R17. At this point, R17 carries out the retransmission (retry) of the SETUP message after a prescribed period of time, but the retry would have to be repeated many times before the RELEASE message arrives from the old route if the retry interval is set too short, whereas a considerable amount of time would elapse before the path is switched to the new route if the retry interval is set too long. Yet, it is generally difficult to determine the optimum value for the retry interval, so that there is a need for a loop prevention mechanism that can minimize the need of the retry.

SUMMARY OF THE INVENTION

It is therefore an object of the present invention to provide a label switched path set up scheme which is capable of detecting a loop of the label switched path efficiently and quickly, and which can enable the switching of the label switched path even in the case where conventionally a label switch path loop would be erroneously detected at a time of the route change, without requiring a label set up retry operation from a previous hop node device of the node device that have erroneously detected the loop which would have been necessary conventionally.

According to one aspect of the present invention there is provided a method for setting up a label switched path, comprising the steps of: judging whether the label switched path forms a loop or not at a node that received a request message regarding a label switched path set up for a packet flow, on a basis of label switched path information stored in a first mode at said node that received the request message, the request message including a flow identifier for identifying the packet flow and information indicating that it is a message currently awaiting a response regarding the packet flow, and the first mode indicating that a message from which the label switched path information originates is a message currently awaiting a response; storing the flow identifier contained in the request message as the label switched path information in the first mode at said node device that received the request message, and transferring the request message from said node that received the request message to another node on a route of the packet flow, when said node that received the request message cannot judge that the label switched path does not form a loop; returning a response message for the request message from said node that received the request message when said node that received the request message judges that the label switched path does not form a loop; and changing the label switched path information currently stored in the first mode at a node that received the response message into a second mode different from the first mode such that the label switched path information that is changed into the second mode will not be used subsequently in judging whether any requested label switched path forms a loop or not at said node that received the response message and the label switched path will become available at said node that received the response message.

According to another aspect of the present invention there is provided a node device for setting up a label switched path, comprising: a judging unit configured to judge whether the label switched path forms a loop or not upon receiving a request message regarding the label switched path set up for a packet flow, on a basis of label switched path information stored in a first mode at a memory of said node device, the request message including a flow identifier for identifying the packet flow and information indicating that it is a message currently awaiting a response regarding the packet flow, and the first mode indicating that a message from which the label switched path information originates is a message currently awaiting a response; a first processing unit configured to store the flow identifier contained in the request message as the label switched path information in the first mode at the memory and transfer the request message to another node on a route of the packet flow, when the judging unit cannot judge that the label switched path does not form a loop, and to return a response message for the request message when the judging unit judges that the label switched path does not form a loop; and a second processing unit configured to change the label switched path information currently stored in the first mode at the memory into a second mode different from the first mode upon receiving the response message, such that the label switched path information that is changed into the second mode will not be used subsequently in judging whether any requested label switched path forms a loop or not at said node device and the label switched path will become available at said node device.

According to another aspect of the present invention there is provided a computer usable medium having computer readable program code means embodied therein for causing a computer to function as a node device for setting up a label switched path, the computer readable program code means includes: first computer readable program code means for causing said computer to judge whether the label switched path forms a loop or not upon receiving a request message regarding the label switched path set up for a packet flow, on a basis of label switched path information stored in a first mode at a memory of said node device, the request message including a flow identifier for identifying the packet flow and information indicating that it is a message currently awaiting a response regarding the packet flow, and the first mode indicating that a message from which the label switched path information originates is a message currently awaiting a response; second computer readable program code means for causing said computer to store the flow identifier contained in the request message as the label switched path information in the first mode at the memory and transfer the request message to another node on a route of the packet flow, when the first computer readable program code means cannot judge that the label switched path does not form a loop, and to return a response message for the request message when the first computer readable program code means judges that the label switched path does not form a loop; and third computer readable program code means for causing said computer to change the label switched path information currently stored in the first mode at the memory into a second mode different from the first mode upon receiving the response message, such that the label switched path information that is changed into the second mode will not be used subsequently in judging whether any requested label switched path forms a loop or not at said node device and the label switched path will become available at said node device.

Other features and advantages of the present invention will become apparent from the following description taken in conjunction with the accompanying drawings.

BRIEF DESCRIPTION OF THE DRAWINGS

FIG. 22 is a block diagram showing a detail configuration of a control message processing unit in the node device of FIG. 21.

DETAILED DESCRIPTION OF THE PREFERRED EMBODIMENTS

Figures 1, 2:
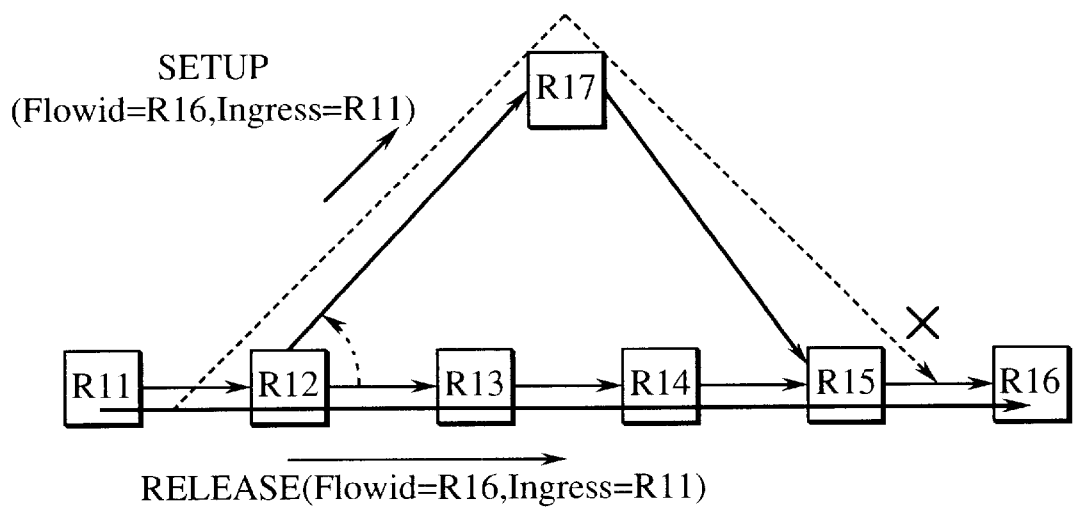
FIG. 1 is a diagram showing an exemplary network for explaining a conventional loop prevention method.
FIG. 2 is a diagram showing a flow table in one node of the network shown in FIG. 1.

Now, one embodiment of the label switched path set up scheme according to the present invention will be described with references to the drawings.

First, the terms used in the following description and a basic configuration of a node device according to the present invention will be described.

<Definition of Directions>

At each node, for each label switched path (hereafter abbreviated as path), a side that is closer to the ingress node will be referred to as "input side" (or "upstream side") and a side that is closer to the egress node will be referred to as "output side" (or "downstream side").

Also, at each node, a label that is allocated to an input side neighboring node (upstream side neighboring node) will be referred to as "input side label" (hereafter abbreviated as input label), and a label that is allocated to an output side neighboring node (downstream side neighboring node) will be referred to as "output side label" (hereafter abbreviated as output label).

<Neighboring Node>

A neighboring node is a node other than the own node to which packets can reach without a label rewriting, which is not necessarily neighboring from a viewpoint of the network protocol. For example, in the case of stacking the label, the neighboring node can be a node that is distanced by two hops or more from a viewpoint of the network protocol when the stack level becomes deep.

<Link>

Each node has "states" related to an individual input label or output label of a given path. A state related to the input label will be referred to as "input link" and a state related to the output label will be referred to as "output link". In the case of deleting the link, a notice for deleting the link is notified to the neighboring nodes.

<Flow>

A flow (packet flow) is a set of packets that flow through a path. The flow is specified by a flow identifier (flow ID).

<Proxy Ingress Node>

A proxy ingress node is a node that "actively" activates the path generation. Here, "actively" implies "without using a path set up request from an upstream side neighboring node directly as a trigger". A term "passively" will be used as an opposite of "actively".

The proxy ingress node is either (1) an ingress node, (2) a node having an input link which requests the allocation of an output label to a downstream side neighboring node due to the route change, or (3) a node having an input link which newly recognized a downstream side neighboring node.

<Path Length>

At a given node, the largest number among the hop counts up to the own node from ingress nodes on the upstream side of the own node will be referred to as a path length. In the case of notifying the path length to the downstream side neighboring node, a value obtained by incrementing the path length at the own node by one will be notified. In order to manage the path length, there is a need to store an information on the path length that is notified from the upstream side neighboring node, for each input link of the path.

In the case where the route is looping, the accurate path length becomes indeterminate. In such a case, a special value <unknown> can be used as the path length. It is assumed that the path length value of <unknown> is larger than the path length values other than <unknown>. When the path length value <unknown> is incremented by one, the resulting path length value is also <unknown>.

<Thread>

When the proxy ingress node requests the allocation of an output label for some path to the downstream side neighboring node regarding some flow, the proxy ingress node generates a "thread" which is an information containing at least an identifier for uniquely identifying in the network a message regarding a path set up for which ACK regarding that flow is awaited, and forwards this "thread" by including it in the message to the downstream side neighboring node, in order to detect and prevent a loop of the path. This thread is a concept newly introduced in the present invention. In the following, forwaring the "thread" by including it in the message will be simply referred to as "notifying the thread". Similarly, receiving the message regarding the path set up that contains the thread will be simply referred to as "receiving the thread". Also, receiving ACK for the message regarding the path set up that contains the thread will be simply referred to as "receiving ACK for the thread".

A thread has at least an identifier (thread color). This thread color is also a concept newly introduced in the present invention. Threads with the same thread color will be regarded as the same thread. Also, a thread may also have an information (thread length) regarding the path length. Here, the ingress node generates a thread with the thread length equal to 0.

In general, a thread is denoted by (thread color, thread length), and in the case where threads do not contain the thread length information, all the threads will have the same setting of the thread length=<unknown> in this embodiment.

<Thread Forwarding>

Each node processes received threads in their received order. Also, there is a need to guarantee the thread transfer order between the neighboring nodes.

In the case of forwarding a thread to the downstream side neighboring node, the thread length is incremented by one. A thread will be forwarded up to a node that can judge whether the path will be looping or not.

A thread that is forwarded to the downstream side neighboring node corresponds to some output link of the node that forwarded it, and a thread received from the upstream side neighboring node corresponds to some input link of that node.

The forwarded thread is set in a forwarding state until ACK for confirming that the thread will not be looping is returned from the downstream side neighboring node.

As an exception, a thread that does not require ACK will be defined in the case of notifying only the update of the path length to the path for which it is already confirmed that the thread will not be looping. A thread that does not require ACK will be identified by the thread color=0.

<Thread Deletion>

The proxy ingress node can actively delete a correspondence between an output link and a thread, but cannot actively delete a correspondence between an input link and a thread. Nodes other than the proxy ingress node cannot actively delete a correspondence between an input link or an output link and a thread.

In the case of deleting some link which is in correspondence to some thread, that some thread will also be deleted.

When the proxy ingress node actively deletes a correspondence between some input link and a thread, if the input link is not deleted, a thread at the output link corresponding to that input link will not be deleted.

When a node other than the proxy ingress node actively deletes a correspondence between some input link and a thread, if no other thread that does not form a loop is set in correspondence to the other input link of the same path, a thread at the output link corresponding to that input link will be deleted.

In the case of deleting a thread that is corresponding to an output link, the deletion of the thread is notified to the downstream side neighboring node.

<Thread Looping>

A thread is said to be looping when a node that is forwarding the thread receives the same thread at an input link that is different from an input link through which that thread.has been received, or when that node is forwarding the same thread as the received thread at an output link.

<Thread Merging>

When a node receives a thread, if the received thread is not looping and there exists another thread which belongs to the same path, the thread merging is carried out. On the contrary, when a thread corresponding to some input link is to be deleted, the thread will be unmerged. If another thread that does not form a loop is still corresponding to the other input link after the deletion, a thread corresponding to the output link will not be deleted.

One thread among those threads which are to be merged is selected according to a selection method which is commonly used throughout the network, and the thread color/thread length of the selected thread will be set as the thread color/thread length of the merged thread. As a selection method for the case of using the thread length, there is a method in which the thread length of the merged thread is set to be the largest value among the thread lengths of the threads that are merged, and the thread color of the merged thread is set to be the thread color of a thread that has the largest thread length, where the thread color of a thread that has the largest thread color value (numerical value indicating the thread color) among those which have the largest thread length value will be used when there are plural threads which have the largest thread length value.

<Thread Updating>

When a node receives a thread that is corresponding to some input link and the thread color or the thread length of a thread that is currently in correspondence to that input link is different from that of the received thread, the received thread is set in correspondence to that input link. The updating of the thread color/thread length is immediately notified to the downstream side neighboring node in the case where the threads are not merged or in the case where the threads are merged and the thread color/thread length of the merged thread changes.

In addition, when some node is updating the information of a thread corresponding to some output link and a further updating with respect to this thread occurs, the new updating is notified to the downstream side neighboring node without waiting for the completion of the previous updating.

By forwarding threads, the following path set up that prevents loops is realized.

<Path Loop Prevention Algorithm>

A thread is forwarded until: (i) it reaches to the egress node, (ii) there exists an established path whose path length is not <unknown> and the thread length of the thread becomes less than or equal to that path length, or (iii) the thread forms a loop or the thread length that is not <unknown> reaches to a threshold.

When the thread forwarding is finished because of either (i) or (ii) above, it is guaranteed that the thread will not form a loop. At this point, it is also guaranteed that the label switched path does not form a loop either so that ACK with respect to the thread is returned hop by hop to the upstream side nodes. A node that transmitted/received ACK clears the forwarding state of the thread.

When ACK is returned up to the proxy ingress node that generated the thread, the label switching becomes possible.

On the other hand, when the thread forwarding is finished because of (iii) above, if the thread forms a loop, the thread length is set to be <unknown>. If the thread length is updated as a result of this, the updated thread length is notified to the downstream side nodes. At this point, the correspondence between the input link and the output link of the looping thread will be maintained. Note that, in the case of not using the thread length, the thread length is always <unknown> so that the update of the thread length will not be notified to the downstream side nodes.

If the route change occurs at the proxy ingress node, a new thread is generated and the generated thread is forwarded to the new route. Before notifying the thread to the new route, any threads in the forwarding state that are corresponding to the output links on the old route are deleted, the deletion of these threads is notified on the old route, and threads on their upstream side and the generated thread are connected (inputs and outputs are related).

When a node receives a thread and the received thread does not form a loop, the path length may be set equal to the received thread length either immediately or upon receiving ACK with respect to the thread.

In the case of notifying only the update of the path length to the downstream side neighboring node in the established path, a thread with the thread color=0 and the thread length=the updated thread length incremented by one will be used. A thread with the thread color=0 will be forwarded to the downstream until the path length updating stops and no ACK is required.

Note that the present invention is applicable to any definition of a flow. Also, the timing at which the ingress node activates the path set up can be either topology driven in which case it is a timing at which a routing table entry for that flow is generated, or flow driven in which case it is a timing at which packets matching that flow actually start flowing.

There can be various criteria for judging packets belonging to the identical flow, including: (1) those packets for which the destination IP address is the same are judged as belonging to the identical flow, (2) those packets for which a portion of the destination IP address corresponding to a network mask is the same are judged as belonging to the identical flow, (3) those packets for which a set of the source IP address and the destination IP address is the same are judged as belonging to the identical flow, (4) those packets for which a set of a portion of the source IP address corresponding to the first network mask and a portion of the destination IP address corresponding to the second network mask is the same are judged as belonging to the identical flow, (5) those packets which pass through a node that has a specific IP address are judged as belonging to the identical flow, and (6)) those packets for which the source and/or destination port numbers are the same in addition to any of (1) to (5) above are judged as belonging to the identical flow.

The present invention is also applicable to either (1) the case (called Ingress control) of generating the label switched path by the initiative of the ingress node, or (2) the case (called Egress Control) of generating the label switched path by the initiative of the egress node.

As for the timing at which a node device that is to be the ingress node transmits the label allocation request message, the following options are available, for example.

(1) Each node device transmits the label allocation request message at a timing of the generation of a routing table for the destination.

(2) Each node device transmits the label allocation request message at a timing at which traffics with respect to the destination exceed a threshold after the generation of a routing table for the destination.

(3) Only a node device that meets conditions that traffic with respect to the destination exceed a threshold after the generation of a routing table for the destination and a previous hop node device of the traffics (datagrams) does not support the label distribution protocol of this embodiment, transmits the label allocation request message by judging the own node as the ingress node at a timing at which these conditions are met (see Internet-Draft<draft-ietf-rolcnhrp-14.txt> "NBMA Next Hop Resolution Protocol (NHRP)", for example).

In the following, this embodiment will be described in further detail using some concrete examples.

A node device of this embodiment has an IP (Internet Protocol) processing function and a label switching function according to the protocol of the present invention. Also a node device other than a node device located at an endpoint which does not carry out relaying may also have a router function. For instance, in FIG. 3, node devices R1 to R4 and R7 to R11 can have the router function while the router function is unnecessary at node devices R5 and R6 when they are located at endpoints and do not carry out relaying.

In the following description, it is assumed that those packets for which the destination IP address is the same are to be judged as belonging to the identical flow, and the description will be given by focusing on a specific flow. Also, the following examples are directed to the case of carrying out the merging (in which a node device carries out the path merging by setting the same output link information in correspondence to a plurality of input side labels for which the flow identifier is the same). Also, in the following examples, it is assumed that the path length is to be set equal to the thread length of a thread when ACK for the thread is returned.

The path has an input link for storing an information of the received thread with respect to each input, and an output link for storing an information of the transmitted thread with respect to each output. Also, the path has an information (flow ID) on a flow that is to be label switched on the path, an information on the path length, a flag (ingress flag) indicating whether the own node is the ingress node or not, and a flag (confirmation flag) indicating whether the path is awaiting ACK with respect to the thread or not.

The thread is identified by (thread color, thread length), and in the following examples, the thread color is to be denoted by "address of proxy ingress node: local ID".

Here, the local ID is an identifier that is newly allocated whenever a thread is newly generated at each proxy ingress node. Note, however, that the description of the local ID will be omitted and the thread color is denoted by "address of proxy ingress node" in the following in the case of the local ID=0.

Also, in the following examples, values of the thread color are to be compared by comparing values of the proxy ingress node addresses (if there are threads for which the proxy ingress node address is the same but sequence numbers are different, values of the thread color are to be compared by comparing values of the sequence numbers). Note that, in the following examples, the proxy ingress node address will be denoted by a symbol such as R1, and for i>j, it is assumed that the value of the proxy ingress node address Ri is greater than the value of the proxy ingress node address Rj.

The confirmation flag of the path is turned off in the case of forwarding a thread to the downstream and turned on in the case of receiving ACK for the thread forwarding. In the case of multicast, it is turned on when ACK for the thread forwarding is received from all the output links.

The input link is identified by an input interface and a link identifier, while an output link is identified by an output interface and a link identifier. The link identifier can be locally allocated at an interface, and a label or any other ID can be used as the link identifier.

As already mentioned, the present invention is equally applicable to the case of path generation by the ingress node initiative and the case of path generation by the egress node initiative, but the following examples will be directed to the case of path generation by the ingress node initiative. The case of path generation by the egress node initiative is basically the same as the case of path generation by the ingress node initiative except that a node that newly received the label allocation request from the downstream side neighboring node of the flow will become the ingress node, generate a thread and forward it to the downstream side neighboring node.

Note also that, in the following description, "a=b" denotes that a value or content of "a" is "b", "a==b" denotes that "a" is equal to "b" (or "a" is "b"), "a!=b" denotes that "a" is not equal to "b" (or "a" is not "b"), "a:=b" denotes that "b" is substituted into or set to "a", "a>=b" denotes that "a" is greater than or equal to "b", "a∥b" denotes that "a" AND "b", and "a && b" denotes "a" OR "b".

<First Concrete Example>

First, the label switched path set up operation to be carried out by a node device according to one embodiment of the present invention will be described using a concrete example.

Figure 3:
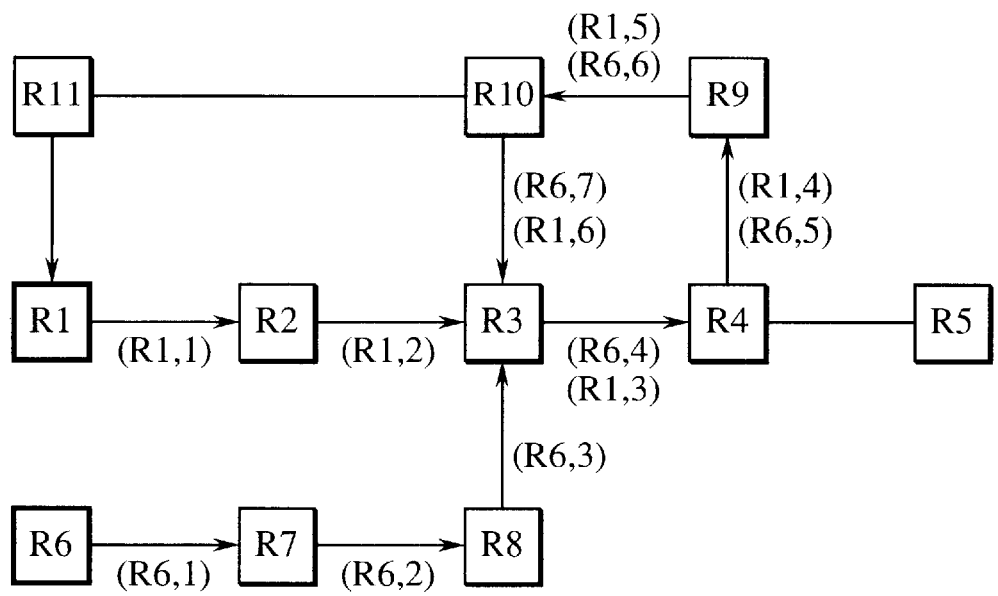
FIG. 3 is a diagram showing one exemplary network formed by connecting node devices according to one embodiment of the present invention.

FIG. 3 shows an exemplary label switched network formed by connecting node devices of this embodiment. In FIG. 3, all or a part of node devices R1 to R11 may be connected to other node devices that are not shown in the figure.

In FIG. 3, a link between neighboring nodes indicates that the label switching is possible between these nodes, and an arrowhead of the link indicates a direction of a current next hop of a flow. Note that FIG. 3 also shows exemplary thread contents which will be explained later on.

Now, in the configuration of FIG. 3, suppose that a node device R1 and a node device R6 start the path set up almost simultaneously.

The node device Ri turns the ingress flag on, generates an output link between the own node device and a node device R2, generates a thread (R1, 0), stores the thread (R1, 0) at the output link, and notifies a thread (R1, 1) to the node device R2. Similarly, the node device R6 turns the ingress flag on, generates an output link between the own node device and a node device R7, generates a thread (R6, 0), stores the thread (R6, 0) at the output link, and notifies a thread (R6, 1) to the node device R7. At this point, the thread is entered into a label allocation request message (SETUP).

Upon receiving the thread (R1, 1), the node device R2 generates a new input link between the own node device and the node device Ri, and stores the thread (R1, 1). Then, the node device R2 generates an output link between the own node device and a node device R3, stores the received thread (R1, 1) at the output link, and notifies a thread (R1, 2) obtained by incrementing the thread length of the received thread (R1, 1) by 1, to the node device R3.

Upon receiving the thread (R6, 1), the node device R7 generates a new input link between the own node device and the node device R6, and stores the thread (R6, 1). Then, the node device R7 generates an output link between the own node device and a node device R8, stores the received thread (R1, 1) at the output link, and notifies a thread (R6, 2) obtained by incrementing the thread length of the received thread (R6, 1) by 1, to the node device R8.

Upon receiving the thread (R6, 2), the node device R8 generates a new input link between the own node device and the node device R7, and stores the thread (R6, 2). Then, the node device R8 generates an output link between the own node device and a node device R3, stores the received thread (R6, 2) at the output link, and notifies a thread (R6, 3) obtained by incrementing the thread length of the received thread (R6, 2) by 1, to the node device R3.

Suppose here that the node device R3 received the thread generated by the node device R1 earlier than the thread generated by the node device R6.

Then, upon receiving the thread (R1, 2), the node device R3 generates a new input link between the own node device and the node device R2, and stores the thread (R1, 2). Then, the node device R3 generates an output link between the own node device and a node device R4, stores the received thread (R1, 2) at the output link, and notifies a thread (R1, 3) obtained by incrementing the thread length of the received thread (R1, 2) by 1, to the node device R4.

After that, upon receiving the thread (R6, 3), the node device R3 generates a new input link between the own node device and the node device R8, and stores the thread (R6, 3). Here, the output link between the own node device and the node device R4 already exists, so that the thread merging is carried out. In this case, the thread length=3 of the received thread (R6, 3) is larger than the thread length=2 of the thread (R1, 2) currently stored at the output link, so that the thread (R1, 2) currently stored at the output link is replaced by the received thread (R6, 3) and a thread (R6, 4) obtained by incrementing the thread length of the received thread (R6, 3) by 1 is notified to the node device R4.

The node device R4 receives the thread (R1, 3) first. At this point, the node device R4 generates a new input link between the own node device and the node device R3, and stores the thread (R1, 3). Then, the node device R4 generates an output link between the own node device and a node device R9, stores the received thread (R1, 3) at the output link, and notifies a thread (R1, 4) obtained by incrementing the thread length of the received thread (R1, 3) by 1, to the node device R9.

The node device R4 next receives the thread (R6, 4). At this point, the input link between the own node device and the node device R3 already exists, so that the thread (R1, 3) currently stored at the input link is replaced by the received thread (R6, 4). Also, the output link between the own node device and the node device R9 already exists, so that the thread (R1, 3) currently stored at the output link is replaced by the received thread (R6, 4) and a thread (R6, 5) obtained by incrementing the thread length of the received thread (R6, 4) by 1 is notified to the node device R9.

Each one of node devices R9 and R10 carries out the operation similar to that of the node device R4.

As a result, the node device R3 receives the thread (R1, 6) and (R6, 7) in this order from the node device R10.

First, upon receiving the thread (R1, 6), the node device R3 generates a new input link between the own node device and the node device R10, and stores the thread (R1, 6). At this point, the same thread is already stored at the input link between the own node device and the node device R2 so that a loop of the thread is detected. In this case, the thread merging is not carried out and ACK is not returned. In addition, the node device R3 updates the thread length of the thread (R6. 3) stored at the output link between the own node device and the node device R4 to <unknown>, and notifies a thread (R6, <unknown>) obtained by incrementing the thread length of the updated thread (R6, <unknown>) by 1, to the node device R4.

Next, upon receiving the thread (R6, 7), the node device R3 stores the thread (R6, 7) at the input link already existing between the own node device and the node device R10. At this point, the same thread is already stored at the input link between the own node device and the node device R8 so that a loop of the thread is detected. In this case, the thread merging is not carried out and ACK is not returned. Here, the thread length of the thread (R6, <unknown>) already stored at the output link between the own node device and the node device R4 will not be updated from <unknown>, so that the update of the thread length is not notified to the node device R4.

Finally, upon receiving the thread (R6, <unknown>), the node device R3 stores the thread (R6, <unknown>) at the input link already existing between the own node device and the node device R10. At this point, the same thread is already stored at the input link between the own node device and the node device R8 so that a loop of the thread is detected. In this case, the thread merging is not carried out and ACK is not returned. Here, the thread length of the thread (R6, <unknown>) already stored at the output link between the own node device and the node device R4 will not be updated from <unknown>, so that the update of the thread length is not notified to the node device R4.

Figure 4:
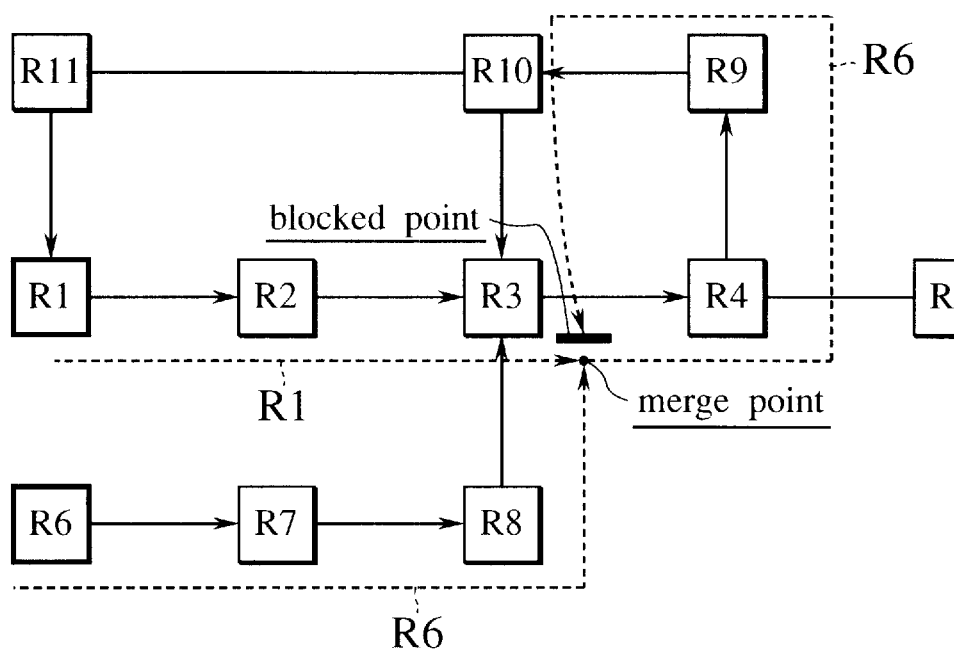
FIG. 4 is a diagram showing an exemplary label switched path that is set up by one embodiment of the present invention in the network shown in FIG. 3.

As a result, the merged thread as indicated by a dashed line in FIG. 4 will remain. Note that in FIG. 4, symbols such as R1 and R6 attached to different portions of the dashed line indicate the thread colors at the respective portions.

Next, the case where the route change occurs at the node device R10 in the state of FIG. 4 so that a next hop node is changed from the node device R3 to a node device R11 will be described with references to FIG. 5 and FIG. 6 which show a thread and a message to be notified in this case.

Figure 5:
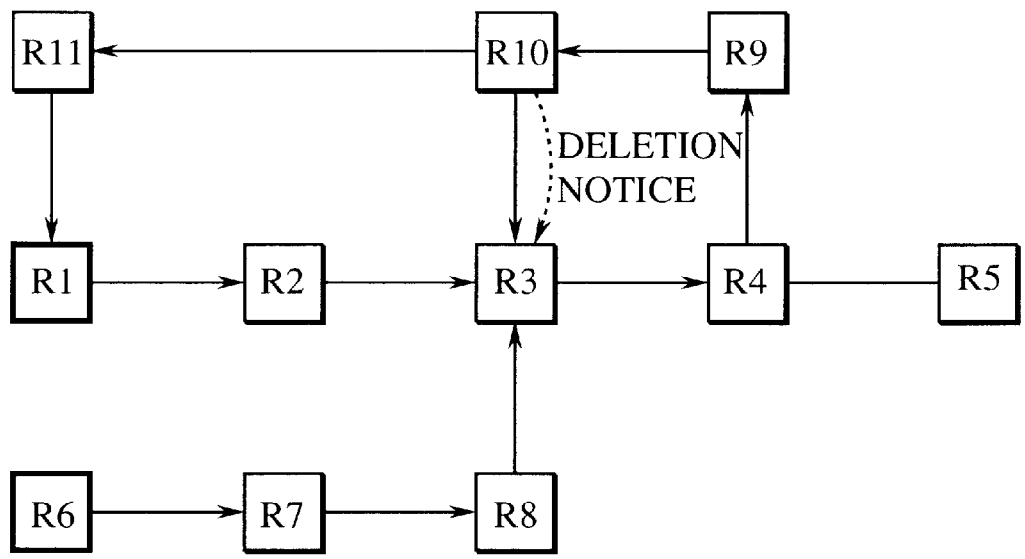
FIG. 5 is a diagram for explaining an exemplary operation of a node device according to one embodiment of the present invention in the case of a route change in the network shown in FIG. 3.
Figure 6:
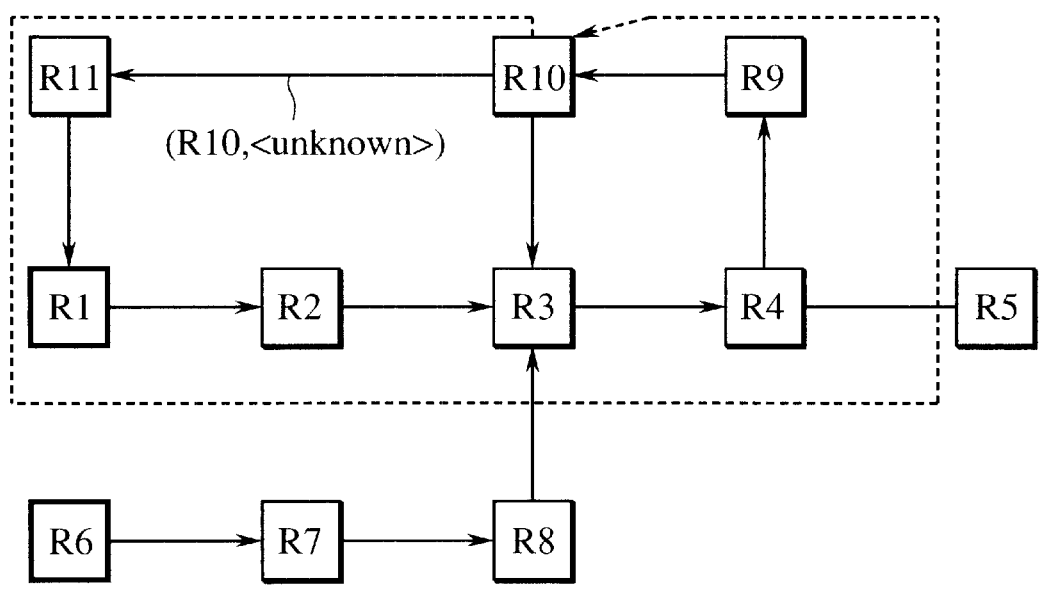
FIG. 6 is a diagram for explaining an exemplary operation of a node device according to one embodiment of the present invention in the case of a route change in the network shown in FIG. 3.

When the next hop node of the node device R10 is changed from the node device R3 to the node device R11, the node device R10 first deletes the output link between the own node device and the node device R3 on the old route, and notifies the deletion of the thread (R6, <unknown>) that has been stored there (see FIG. 5). The notification of thread deletion is realized by transmitting a thread deletion message. Next, the node device R10 generates a thread (R10, <unknown>), generates an output link between the own node device and the node device R11 on the new route, stores the thread (R10, <unknown>) at the output link, and notifies a thread (R10, <unknown>) obtained by incrementing the thread length of the generated thread (R10, <unknown>) by 1, to the node device R11 (see FIG. 6).

When the node device R3 receives the deletion notice for the thread (R6, <unknown>), the node device R3 deletes the corresponding input link.

On the other hand, upon receiving the thread (R10, <unknown>), the node device R11 generates a new link between the own node and the node device R10, and stores the received thread (R10, <unknown>). Then, the node device R11 generates an output link between the own node device and the node device R1, stores the received thread (R10, <unknown>) at the output link, and notifies a thread (R10, <unknown>) obtained by incrementing the thread length of the received thread (R10, <unknown>) by 1, to the node device R1.

Upon receiving the thread (R10, <unknown>), the node device R1 generates a new input link between the own node device and the node device R11, and stores the received thread (R10, <unknown>). Here, the output link between the own node device and the node device R2 already exists, so that the thread merging is carried out. In this case, the thread length=<unknown> of the received thread (R10, <unknown>) is larger than the thread length=0 of the thread (R1, 0) currently stored at the output link, so that the thread (R1, 0) currently stored at the output link is replaced by the received thread (R10, <unknown>) and a thread (R10, <unknown>) obtained by incrementing the thread length of the received thread (R10, <unknown>) by 1 is notified to the node device R2.

The node device R2 receives the thread (R10, <unknown>). At this point, the input link between the own node device and the node device Ri already exists, so that the thread (R1, 1) currently stored at the input link is replaced by the received thread (R10, <unknown>). Also, the output link between the own node device and the node device R3 already exists, so that the thread (R1, 1) currently stored at the output link is replaced by the received thread (R10, <unknown>) and a thread (R10, <unknown>) obtained by incrementing the thread length of the received thread (R10, <unknown>) by 1 is notified to the node device R3.

The node device R3 receives the thread (R10, <unknown>). At this point, the input link between the own node device and the node device R2 already exists, so that the thread (R1, 2) currently stored at the input link is replaced by the received thread (R10, <unknown>). Also, the output link between the own node device and the node device R4 already exists, so that the thread (R6, 3) currently stored at the output link is replaced by the received thread (R10, <unknown>) and a thread (R10, <unknown>) obtained by incrementing the thread length of the received thread (R10, <unknown>) by 1 is notified to the node device R4. This thread will be forwarded up to the node device R10 (see FIG. 6). At this point, the node device R10 detects a loop of the thread (R10, <unknown>), but the thread length is already <unknown> so that the update of the thread length is not notified to the node device R11.

Figure 7:
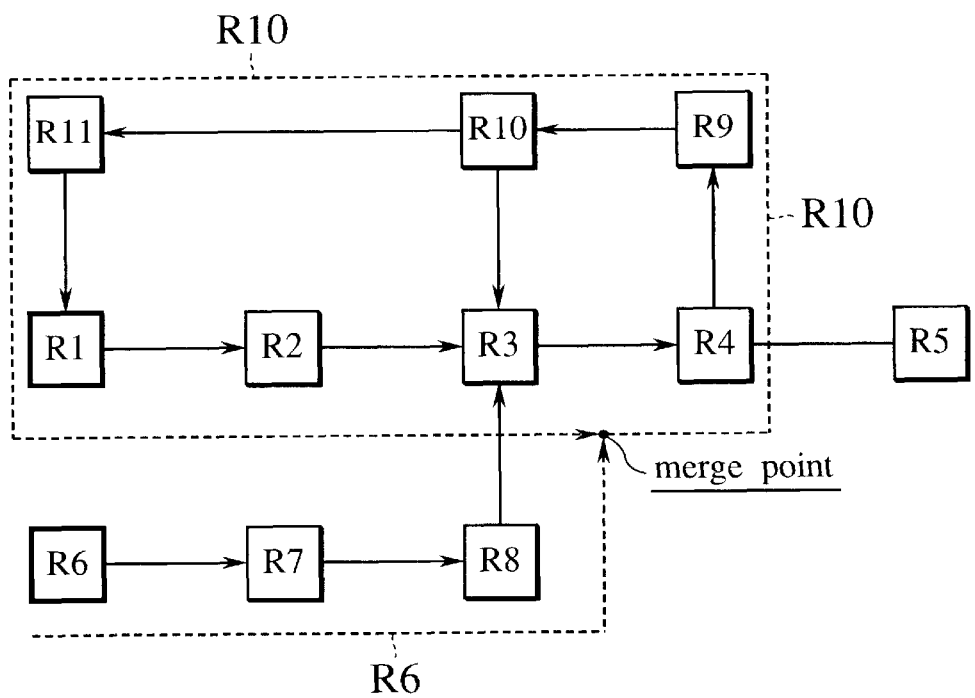
FIG. 7 is a diagram showing an exemplary label switched path that is obtained as a result of the router change in the network shown in FIG. 3.

As a result, the merged thread as indicated by a dashed line in FIG. 7 will remain.

Next, the case where the route change occurs at the node device R4 in the state of FIG. 7 so that a next hop node is changed from the node device R9 to a node device R5 will be described with references to FIG. 8 and FIG. 9 which show a thread and messages to be notified in this case. Here, FIG. 8 corresponds to Pattern 1 described below, while FIG. 9 corresponds to Pattern 2 described below.

Figure 8:
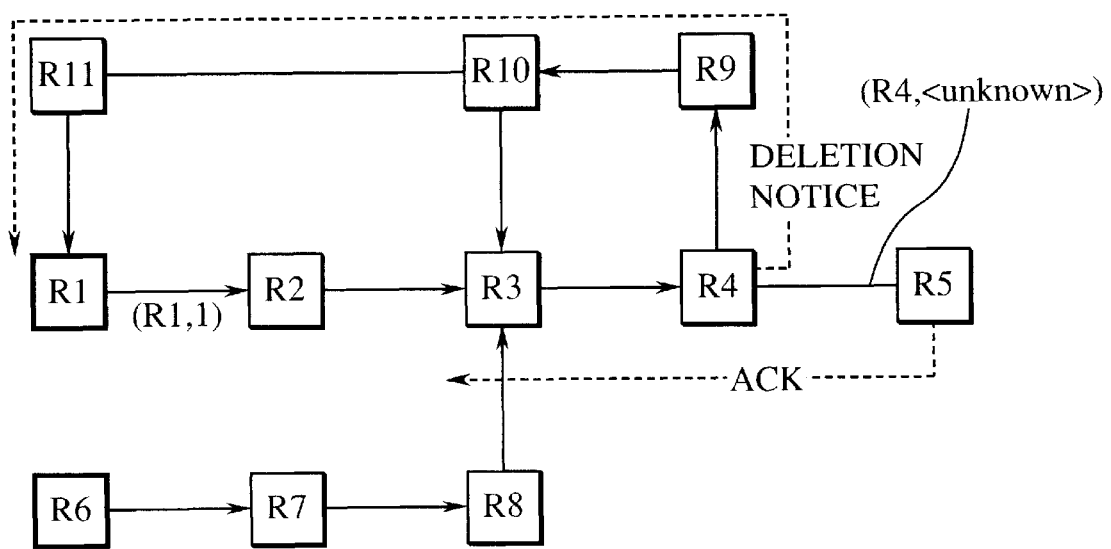
FIG. 8 is a diagram for explaining an exemplary operation of a node device according to one embodiment of the present invention in the case of a further route change in the network shown in FIG. 3.
Figure 9:
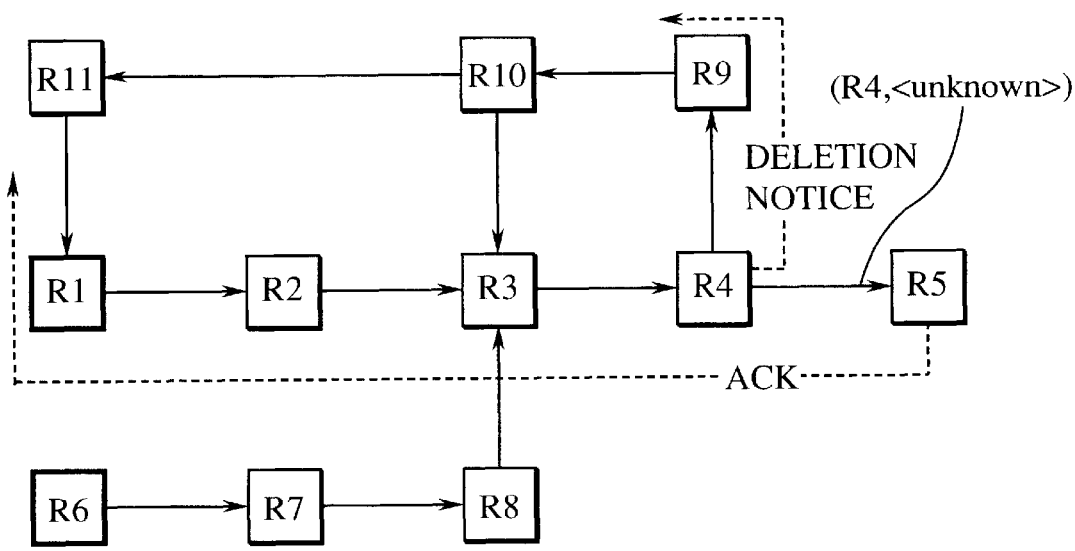
FIG. 9 is a diagram for explaining an exemplary operation of a node device according to one embodiment of the present invention in the case of a further route change in the network shown in FIG. 3.

When the next hop node of the node device R4 is changed from the node device R9 to the node device R5, the node device R4 first deletes the output link between the own node device and the node device R9 on the old route, and notifies the deletion of the thread (R10, <unknown>) that has been stored there (see FIG. 8 and FIG. 9). The notification of thread deletion is realized by transmitting a thread deletion message. Next, the node device R4 generates a thread (R4, <unknown>), generates an output link between the own node device and the node device R5 on the new route, stores the thread (R4, <unknown>) at the output link, and notifies a thread (R4, <unknown>) obtained by incrementing the thread length of the generated thread (R4, <unknown>) by 1, to the node device R5.

When the node device R5 which is the egress node receives the thread (R4, <unknown>), the node device R5 generates a new input link between the own node device and the node device R4, sets the path length to <unknown>, and returns ACK for the received thread. Here, a label allocation success message is used as ACK for the received thread. At this point, the node device R5 sets the thread color to be stored at the generated input link to 0.

On the other hand, suppose that the thread deletion on the old route is notified up to the node device R11 while deleting the input link and the output link at each node.

Now, the thread deletion notice is forwarded on the old route and ACK for the thread is forwarded on the new route, but the subsequent operation will be different depending on which one of these arrives first. In the following, two cases including (1) the case where the thread deletion notice forwarded on the old route arrives at the ingress node earlier than ACK for the thread forwarded on the new route, and (2) the case where the thread deletion notice forwarded on the old route arrives at the ingress node later than ACK for the thread forwarded on the new route, will be described separately as Pattern 1 and Pattern 2, respectively.

(Pattern 1)

First, the case where the thread deletion notice forwarded on the old route arrives at the ingress node earlier than ACK for the thread forwarded on the new route will be considered.

Upon receiving the thread deletion notice from the node device R4, the node device R9 deletes the corresponding input link and the corresponding output link, and forwards the thread deletion notice to the node device R10. The node devices R10 and R11 carry out the similar operation.

When the node device R1 receives the thread deletion notice from the node device R11, the node device R1 deletes the input link between the own node device and the node device R11. The node device R1 also has the output link corresponding to the deleted input link, but this output link is not deleted because the ingress flag is on.

Upon receiving ACK from the node device R5, the node device R4 sets the path length to the thread length=<unknown> of the thread (R4, <unknown>) corresponding to ACK, returns ACK to the upstream side node device R3, and sets the thread color to be stored at the input link between the own node device and the upstream side node device R3 to 0. Upon receiving ACK, the node device R3 sets the path length to the thread length=<unknown> of the thread (R10, <unknown>) corresponding to ACK, returns ACK to the upstream side node devices R2 and R8, and sets the thread color to be stored at the input links between the own node device and the upstream side node devices R2 and R8 to 0. The node devices R8, R7 and R2 carry out the similar operation.

When the ingress node device R6 receives ACK, the node device R6 sets the path length to the thread length=0 of the thread (R6, 0) corresponding to ACK.

When the ingress node device R1 receives ACK, it becomes capable of carrying out the label switching upon receiving an ACK for the thread (R10, <unknown>) from the node device R2. In this case the node device Ri changes the path length from <unknown> to 0, and sends an update message (UPDATE) to the node device R2 with a thread (0, 1).

When the node device R2 receives the UPDATE from the node device R1 with the thread (0, 1), the node device R2 sends an UPDATE to the node device R3 with a thread (0, 2).

When the node device R3 receives the UPDATE from the node device R2 with the thread (0, 2), the path length is changed from <unknown> to 3 and the node device R3 sends an UPDATE to the node device R4 with a thread (0, 4).

Eventually the node device R5 recieves an UPDATE with a thread (0, 5) and the path length at the node device R5 is changed to 5. The node device R5 does not truen an ACK.
(Pattern 2)

Next, the case where the thread deletion notice forwarded on the old route arrives at the ingress node later than ACK for the thread forwarded on the new route, will be considered.

Upon receiving ACK from the node device R5, the node device R4 sets the path length to the thread length=<unknown> of the thread (R4, <unknown>) corresponding to ACK, returns ACK to the upstream side node device R3, and sets the thread color to be stored at the input link between the own node device and the upstream side node device R3 to 0. Upon receiving ACK, the node device R3 sets the path length to the thread length=<unknown> of the thread (R10, <unknown>) corresponding to ACK, returns ACK to the upstream side node devices R2 and R8, and sets the thread color to be stored at the input links between the own node device and the upstream side node devices R2 and R8 to 0. The node devices R1, R2, R8 and R7 carry out the similar operation.

When the ingress node device R6 receives ACK, the node device R6 sets the path length to the thread length=0 of the thread (R6, 0) corresponding to ACK.

Here, suppose that the node device R11 receives ACK from the node device R1 before receiving the thread deletion notice from the node device R11.

Then, upon receiving ACK from the node device R1, the node device R11 sets the path length to the thread length=<unknown> of the thread (R11, <unknown>) corresponding to ACK, returns ACK to the upstream side node device R10, and sets the thread color to be stored at the input link between the own node device and the upstream side node device R10 to 0. Next, the node device R11 receives the thread deletion notice from the node device R11, but the confirmation flag of the path is already on so that the input link is not deleted and the thread deletion notice is not notified to the node device R1.

When the node device R10 receives ACK from the node device R11, the corresponding output link is already absent, so that the node device R10 transmits a label release message (RELEASE) to the node device R11. Upon receiving the label release message from the node device R10, the node device R11 deletes the input link between the own node device and the node device R10 as well as the output link between the own node device and the node device R1, and forwards the label release message to the node device R1.

Upon receiving the label release message, the node device R1 deletes the input link between the own node device and the node device R11. At this point, the ingress flag is on so that the output link corresponding to the input link is not deleted, and the path length is changed from <unknown> to 0. Also, the confirmation flag of the path is on and the path length will not be increased so that the node device RI notifies a thread (0, 1) in which the thread color is set equal to 0 and the thread length is set equal to a value obtained by incrementing the path length by 1, to the node device R2. At this point, the thread (0, 1) is entered into the update message.

Each of the node devices R2, R3 and R4 that received the thread with the thread color=0 replaces the thread to be stored at the receiving link to the received thread, and then sets the larger one of the thread length of the input link that stores the thread with the thread color=0 and the thread length of the received thread, as a new path length. If the path length is updated, a thread with the thread color=0 obtained by incrementing the updated path length by 1 is notified to the downstream side node by using the update message. This notification reaches to the node device R5, and eventually the path length at the node device R5 is changed to 5. The node device R5 does not return ACK.

Figure 10:
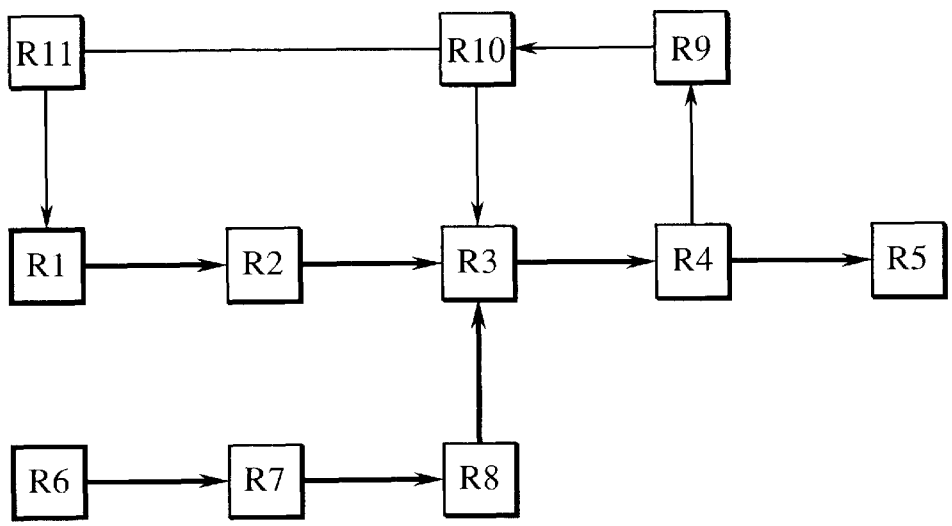
FIG. 10 is a diagram showing an exemplary label switched path that is obtained as a result of the further router change in the network shown in FIG. 3.

As a result, a path R1→R2→R3→R4→R5 as indicated by a bold line in FIG. 10 is eventually formed.

By the above operation, no matter where on the looping path does the route change occur, it becomes possible to return to the normal path without requiring any retry when the loop is released.

Here, the label allocation is not carried out at a node that is notifying a thread while there is a loop so that it is possible to save the label resources. In addition, packets of the flow for which the label allocation is not carried out can be discarded at the proxy ingress node so that it is also possible to save the network resources as well.

Note that, in the case where the route change occurs at the node device R10 in the state shown in FIG. 7 so that the next hop node of the node device R10 is changed from the node device R11 to the node device R3, the node device R10 first notifies the deletion of the thread (R10, <unknown>) to the node device R11, generates a new thread (R10:1, <unknown>), and notifies a thread (R10:1, <unknown>) obtained by incrementing the thread length of the generated thread (R10:1, <unknown>) by 1, to the node device R3. This thread is notified to the node devices R3, R4, R9, and R10, and the node device R10 receives the thread (R10:1, <unknown>) that was generated by the own node device. At this point, the thread length remains unchanged from <unknown> so that the update of the thread length is not notified to the node device R3.

<Second Concrete Example>

Next, the label switched path set up operation to be carried out by a node device according to one embodiment of the present invention will be described using another concrete example.

Figure 11:
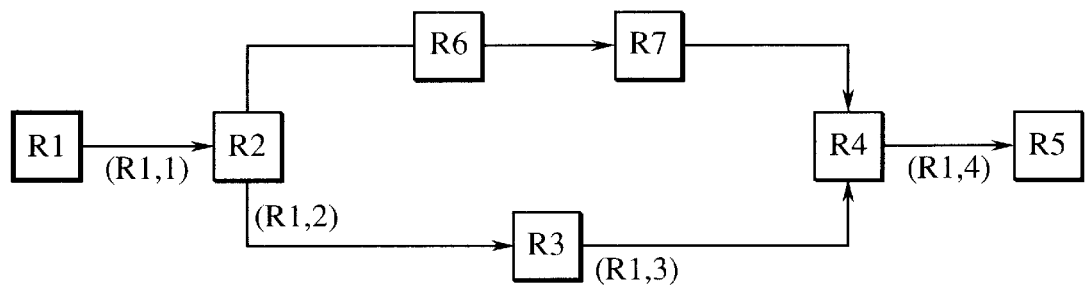
FIG. 11 is a diagram showing another exemplary network formed by connecting node devices according to one embodiment of the present invention.

FIG. 11 shows another exemplary label switched network formed by connecting node devices of this embodiment. In FIG. 11, all or a part of node devices R1 to R7 may be connected to other node devices that are not shown in the figure.

In FIG. 11, a link between neighboring nodes indicates that the label switching is possible between these nodes, and an arrowhead of the link indicates a direction of a current next hop of a flow. Note that FIG. 11 also shows exemplary thread contents which will be explained later on.

It is assumed here that node devices R1, R2, R3 and R4 on the path store the path lengths 0, 1, 2 and 3, respectively.

Now, in the configuration of FIG. 11, suppose that the node device R1 starts the path set up.

The node device RI turns the ingress flag on, generates an output link between the own node device and a node device R2, generates a thread (R1, 0), stores the thread (R1, 0) at the output link, and notifies a thread (R1, 1) to the node device R2.

Upon receiving the thread (R1, 1), the node device R2 generates a new input link between the own node device and the node device R1, and stores the thread (R1, 1). Then, the node device R2 generates an output link between the own node device and a node device R3, stores the received thread (R1, 1) at the output link, and notifies a thread (R1, 2) obtained by incrementing the thread length of the received thread (R1, 1) by 1, to the node device R3. The node device R4 carries out the similar operation.

Upon receiving the thread (R1, 4) from the node device R4, the node device R5 which is the egress node generates a new input link between the own node device and the node device R4, and stores the thread (R1, 4). Then, the node device R5 sets the path length to 4 and returns ACK for the received thread. Here, a label allocation success message is used as ACK for the received thread.

Upon receiving ACK from the node device R5, the node device R4 sets the path length to the thread length=3 of the thread (R1, 3) corresponding to ACK, and returns ACK to the upstream side node device R2. The node device R2 carries out the similar operation.

When the ingress node device R1 receives ACK, the node device R1 sets the path length to the thread length=0 of the thread (R1, 0) corresponding to ACK.

Figure 12:
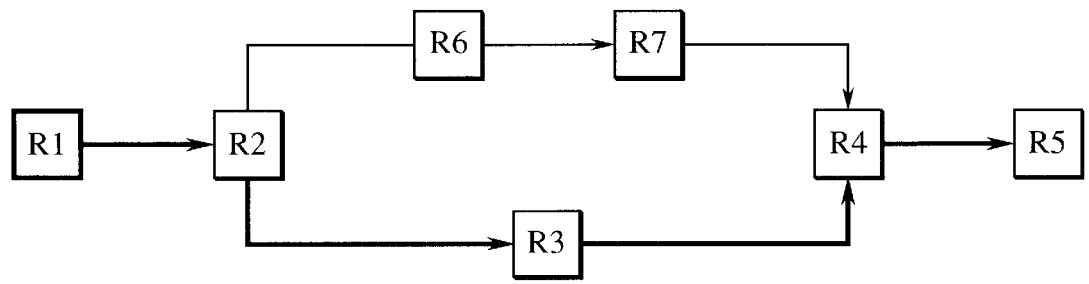
FIG. 12 is a diagram showing an exemplary label switched path that is set up by one embodiment of the present invention in the network shown in FIG. 11.

In this way, a label switched path R1→R2→R3→R4→R5 as indicated by a bold line in FIG. 12 is set up.

Figure 13:
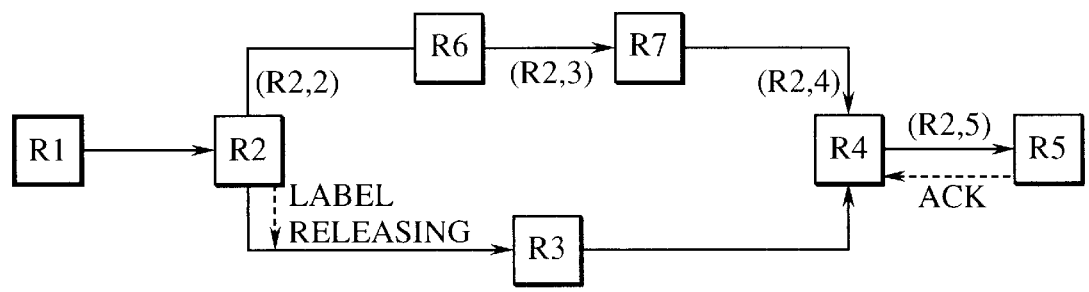
FIG. 13 is a diagram for explaining an exemplary operation of a node device according to one embodiment of the present invention in the case of a route change in the network shown in FIG. 11.

Next, the case where the route change occurs at the node device R2 in the state of FIG. 12 so that a next hop node is changed from the node device R3 to a node device R6 will be described with reference to FIG. 13 which shows threads and messages to be notified in this case.

When the next hop node of the node device R2 is changed from the node device R3 to the node device R6, the node device R2 generates a thread (R2, 1) having the thread length equal to the current path length, generates an output link between the own node device and the node device R6 on the new route, stores the thread (R2, 1) at the output link, and notifies a thread (R2, 2) obtained by incrementing the thread length of the generated thread (R2, 1) by 1, to the node device R6.

Upon receiving the thread (R2, 2), the node device R4 generates a new input link between the own node device and the node device R2, and stores the thread (R2, 2). Then, the node device R4 generates an output link between the own node device and a node device R7, stores the received thread (R2, 2) at the output link, and notifies a thread (R2, 3) obtained by incrementing the thread length of the received thread (R2, 2) by 1, to the node device R7. The node device R7 carries out the similar operation.

Upon receiving the thread (R2, 4), the node device R4 generates a new input link between the own node device and the node device R7, and stores the thread (R2, 4). Then, the node device R4 carries out the flow merging because the output link between the own node and the node device R5 for the same flow already exists. At this point, the path length increases from 3 to 4 after the merging so that the received thread (R2, 4) is stored at the output link and a thread (R2, 5) obtained by incrementing the thread length of the received thread (R2, 4) by 1 is sent to the node device R5.

When the egress node device R5 receives the thread (R2, 5), the node device R5 sets the path length to the thread length=5 of the received thread, and returns ACK for the received thread to the node device R4.

Upon receiving ACK from the node device R5, the node device R4 sets the path length to the thread length=4 of the thread (R2, 4) corresponding to ACK, and returns ACK to the upstream side node device R7. Upon receiving ACK, the node device R7 sets the path length to the thread length=3 of the thread (R2, 3) corresponding to ACK, and returns ACK to the upstream side node device R6. The node device R6 carries out the similar operation.

When the node device R2 receives ACK from the node device R6, the label switched path R1→R2→R6→R7→R4→R5 is set up on the new route. In addition, the node device R2 deletes the output link between the own node device and the node device R3 on the old route, and transmits the label release message to the node device R3.

Upon receiving the label release message, the node device R3 deletes the input link between the own node device and the node device R2 as well as the output link between the own node device and the node device R4, and forwards the label release message to the node device R4.

Upon receiving the label release message, the node device R4 deletes the input link between the own node device and the node device R3, but the output link is not deleted because there is another input link. Also, the path length is not increased after the deletion of the input link so that the path length change with respect to the downstream side node is also not carried out.

Figure 14:
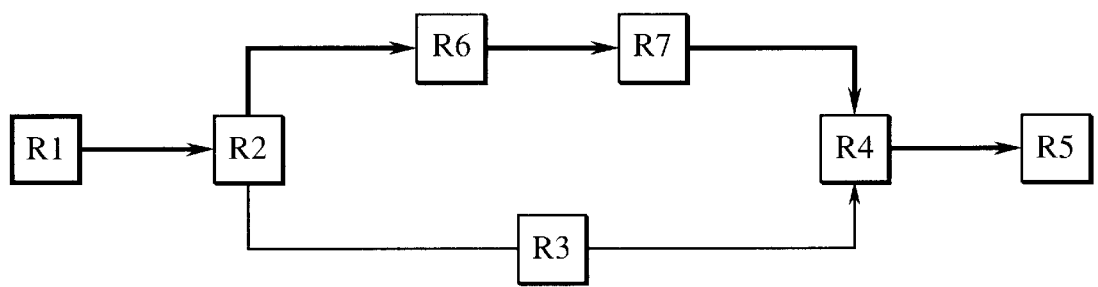
FIG. 14 is a diagram showing an exemplary label switched path that is obtained as a result of the router change in the network shown in FIG. 11.

As a result, a path as indicated by a bold line in FIG. 14 is formed.

Here, even when the label release message cannot be forwarded because of the breakdown of the physical link on the old route, the same result can be obtained if the node device R4 carries out the same operation as in the case of receiving the label release message from the node device R3, upon noticing the breakdown of the downstream side node of the physical link.

Figure 15:
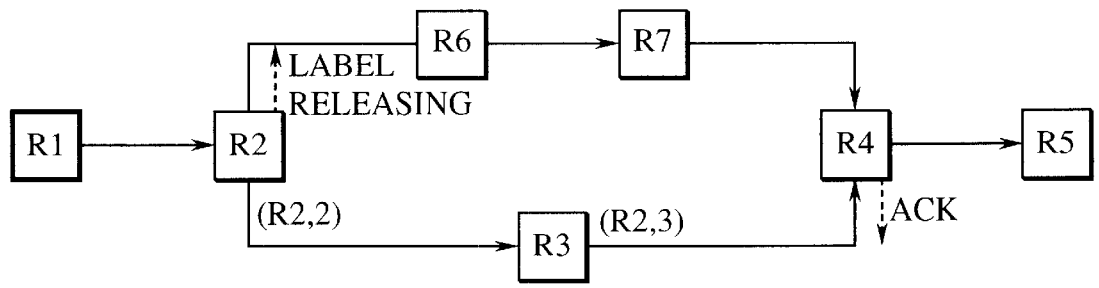
FIG. 15 is a diagram for explaining an exemplary operation of a node device according to one embodiment of the present invention in the case of a further route change in the network shown in FIG. 11.

Next, the case where the route change occurs again at the node device R2 in the state of FIG. 14 so that a next hop node is changed from the node device R6 to the node device R3 will be described with reference to FIG. 15 which shows threads and messages to be notified in this case.

When the next hop node of the node device R2 is changed from the node device R6 to the node device R3, the node device R2 generates a thread (R2, 1) having the thread length equal to the current path length, generates an output link between the own node device and the node device R3 on the new route, stores the thread (R2, 1) at the output link, and notifies a thread (R2, 2) obtained by incrementing the thread length of the generated thread (R2, 1) by 1, to the node device R3.

Upon receiving the thread (R2, 2), the node device R3 generates a new input link between the own node device and the node device R2, and stores the thread (R2, 2). Then, the node device R3 generates an output link between the own node device and the node device R4, stores the received thread (R2, 2) at the output link, and notifies a thread (R2, 3) obtained by incrementing the thread length of the received thread (R2, 2) by 1, to the node device R4.

Upon receiving the thread (R2, 3), the node device R4 generates a new input link between the own node device and the node device R3, and stores the thread (R2, 3). Then, the node device R4 carries out the flow merging because the output link between the own node and the node device R5 for the same flow already exists. At this point, the path length remains unchanged from 4 after the merging so that the node device R4 returns ACK to the node device R3 immediately.

Upon receiving ACK from the node device R4, the node device R3 sets the path length to the thread length=2 of the thread (R2, 2) corresponding to ACK, and returns ACK to the upstream side node device R2.

When the node device R2 receives ACK from the node device R3, the label switched path R1→R2→R3→R4→R5 is set up on the new route. In addition, the node device R2 deletes the output link between the own node device and the node device R6 on the old route, and transmits the label release message to the node device R6.

Upon receiving the label release message, the node device R6 forwards the label release message to the node device R4. The node device R7 carries out the similar operation.

Upon receiving the label release message, the node device R4 deletes the input link between the own node device and the node device R7, but the output link is not deleted because there is another input link. Also, the path length is decreased from 4 to 3 after the deletion of the input link so that the path length of 3 is set to the downstream side node and a thread (0, 4) obtained by incrementing the path length by 1 is sent to the node device R5.

The node device R5 that received the thread with the thread color=0 sets the path length to the thread length of the received thread, but does not return ACK.

As a result, the path as indicated by a bold line in FIG. 12 is set up again.

If the new route forms a loop, ACK for the thread will not return until the loop is resolved. In this case, the path on the old route will not be released so that it is possible to continue to use the path on the old route.

Note however that the present invention is also effective in the case of setting up a path on the new route after releasing a path on the old route at a time of the route change.

In the following, an exemplary internal database, an exemplary processing procedure of a node device at a time of thread receiving, an exemplary processing procedure of a node device at which a route change occurred, and an exemplary message format according to this embodiment will be described.

First, an exemplary configuration of an internal database to be used for the loop detection in the node device of the present invention will be described.

Figure 16:
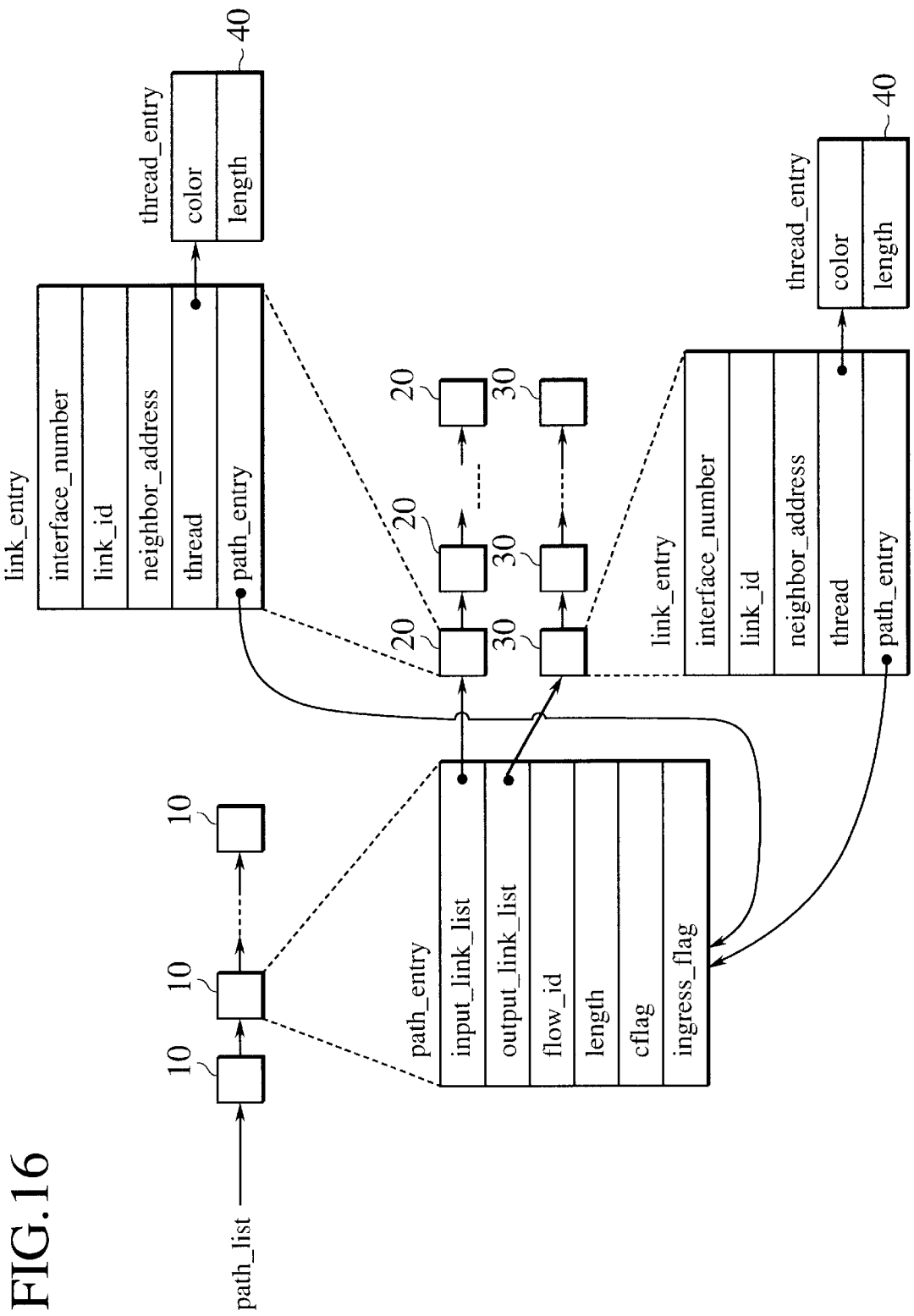
FIG. 16 is a diagram showing an exemplary configuration of an internal database used for a loop detection in one embodiment of the present invention.
Figure 17:
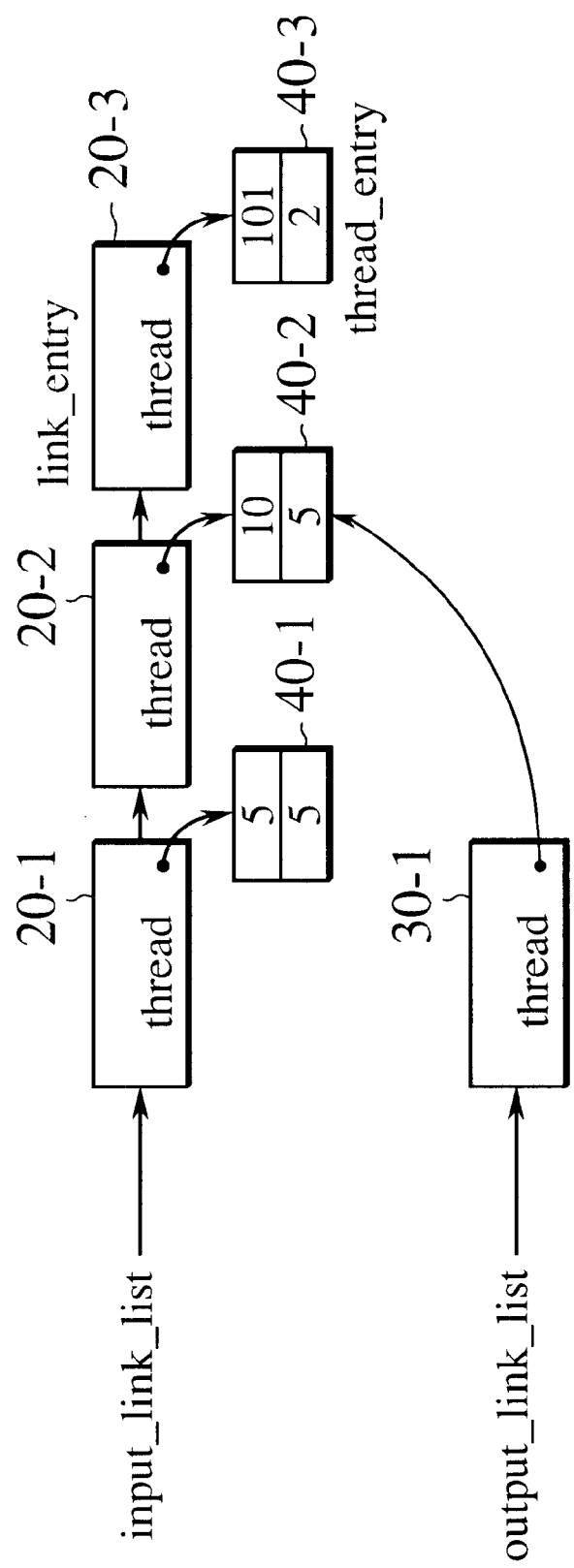
FIG. 17 is a diagram showing a further detail of an exemplary configuration of an internal database used for a loop detection in one embodiment of the present invention.

FIG. 16 and FIG. 17 show an exemplary configuration of the internal database.

Individual label switched path information is stored in a path entry (path_entry), and a path list (path_list 10 of FIG. 16) is a linked list of path entries.

The path entry has an input link list (input link_list), an output link list (output_link_list), a flow identifier (flow_id), a path length (length), a confirmation flag (cflag), and an ingress flag (ingress_flag).

The input link list is a linked list of link entry (link_entry 20 of FIG. 16) for storing an information on individual input side link of the path.

The output link list is a linked list of link entry (link_entry 30 of FIG. 16) for storing an information on individual output side link of the path. In the case of multicast, it has a plurality of link entries. Also, even in the case of unicast, it may have two link entries for an old route and a new route at a time of the route change.

The flow identifier (or flow ID) stores an information on a flow that is label switched on this path.

The path length stores the number of hops from the most distant ingress node.

The confirmation flag is a flag for indicating whether there is a thread that is awaiting ACK or not.

The ingress flag is a flag for indicating whether it is the ingress node of the path or not.

The link entry stores information on an interface number (interface_number), a link identifier (link_id), a neighboring node address (neighbor_address), a thread (thread), a path entry (pass_entry).

The interface number is a number uniquely allocated to each logical interface within the node.

The link identifier is an identifier for identifying a link between the neighboring nodes.

The neighboring node address stores an address of a node on the other side of the link.

The thread is a pointer to a thread entry (40 of FIG. 16). The thread entry has attributes of a thread color (color) and a thread length (length). The thread entry is shared among the input/output link entries of the same path.

The path entry in the link entry is a pointer for pointing a path entry which has this link entry in the input or output link list. This enables access to the path entry information from each link, as well as access from the input link side to the output link side information or access from the output link side to the input link side information.

Next, FIG. 17 shows an exemplary thread entry to be shared among the input/output link entries in a given path entry. FIG. 17 shows link entries 20-1 to 20-3 of the input side links, a link entry 30-1 of the output side link, and thread entries 40-1 to 40-3.

FIG. 17 shows a state where three threads (5, 5), (10, 5) and (101, 2) are merged. In this case, the thread (10, 5) is shared by the input link entry and the output link entry. This implies that, among the threads (5, 5) and (10, 5) which have the largest thread length (=5), one with the largest thread color value has been selected as the thread after merging.

Figure 18:
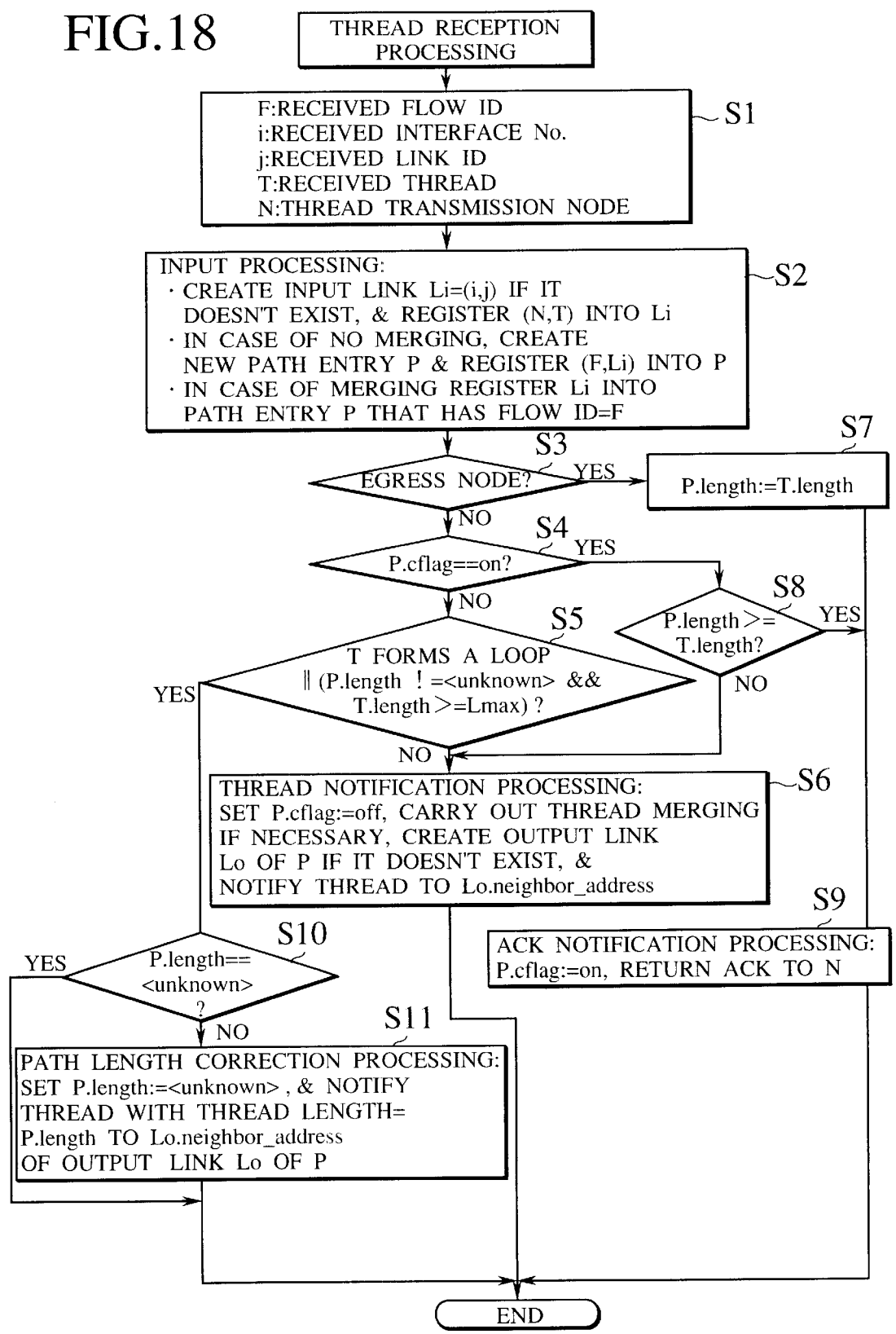
FIG. 18 is a flow chart of an exemplary operation of a node device according to one embodiment of the present invention at a time of thread receiving.

Next, a processing procedure of the node device at a time of thread receiving will be described. FIG. 18 shows a flow chart for an exemplary processing procedure of the node device at a time of thread receiving. Here, an exemplary case of updating the path length without waiting for ACK for the thread will be described.

First, it is set that F denotes a received flow identifier, i denotes a received interface number, j denotes a received link identifier, T denotes a received thread, and N denotes a neighboring node that transmitted the thread (step S1).

Then, a thread input processing is carried out (step S2). In the input processing, an input link Li that is uniquely specified by (received interface number i, received link identifier j) is searched, and if a corresponding entry cannot be found, it is newly created and a set of (N, T) is registered into the input link Li. Then, if paths are not to be merged, a new path entry P is created and a set of (flow identifier F, input link Li) is registered into the path entry P. If paths are to be merged, the input link Li is registered into the existing path entry P that has the flow identifier F.

Then, the following thread processing is carried out.

First, whether or not the own node is the egress node, that is, the end point of the path, or not is checked (step S3). If the own node is the egress node, the path length is set equal to the received thread length (P.length:=T.length) (step S7), an ACK notification processing is carried out (step S9) and the processing is finished.

On the other hand, if the own node is not the egress node, whether or not the confirmation flag is on (P.cflag==on?) is checked (step S4). If the confirmation flag is on, there is no thread that is waiting for ACK, so that whether or not the path length is greater than or equal to the thread length (P.length>=T.length?) is checked (step S8), and if yes, the ACK notification processing is carried out (step S9) and the processing is finished. Otherwise, whether it is a loop or not cannot be judged at this node, so that a thread notification processing is carried out (step S6) and the processing is finished.

On the other hand, when the confirmation flag is off at the step S4, whether or not the thread T forms a loop and, the path length is not equal to <unknown> or the thread length is not less than a threshold Lmax, is checked (step S5), and if not, the thread notification processing is carried out (step S6) and the processing is finished.

Otherwise, whether or not the path length is equal to <unknown> or not is checked (step S10), and if not, a path length correction processing is carried out (step S12), the thread color of the thread stored at the input link Li is set equal to 0 (T.color:=0) (step S12), and the processing is finished. If the path length is equal to <unknown>, the thread color of the thread stored at the input link Li is set equal to 0 (T.color:=0) and the processing is finished.

In the ACK notification processing, the confirmation flag of the path is turned on (P.cflag:=on), and ACK is returned to the neighboring node N.

In the thread notification processing, the confirmation flag of the path is turned off (P.cflag off), the thread merging is carried out if necessary, an output link Lo of the path entry P is newly created if it does not exist, and the thread is notified to the neighboring node specified by Lo.neighbor_address. Note that threads that are targets of the merging are those threads for which the thread length is not equal to 0 among threads registered at the input link.

In the thread length correction processing, the path length is set equal to <unknown> and a thread with the thread length equal to the path length is notified to the downstream side neighboring node specified by Lo.neighbor_address of the output link Lo of the path.

Figure 19:
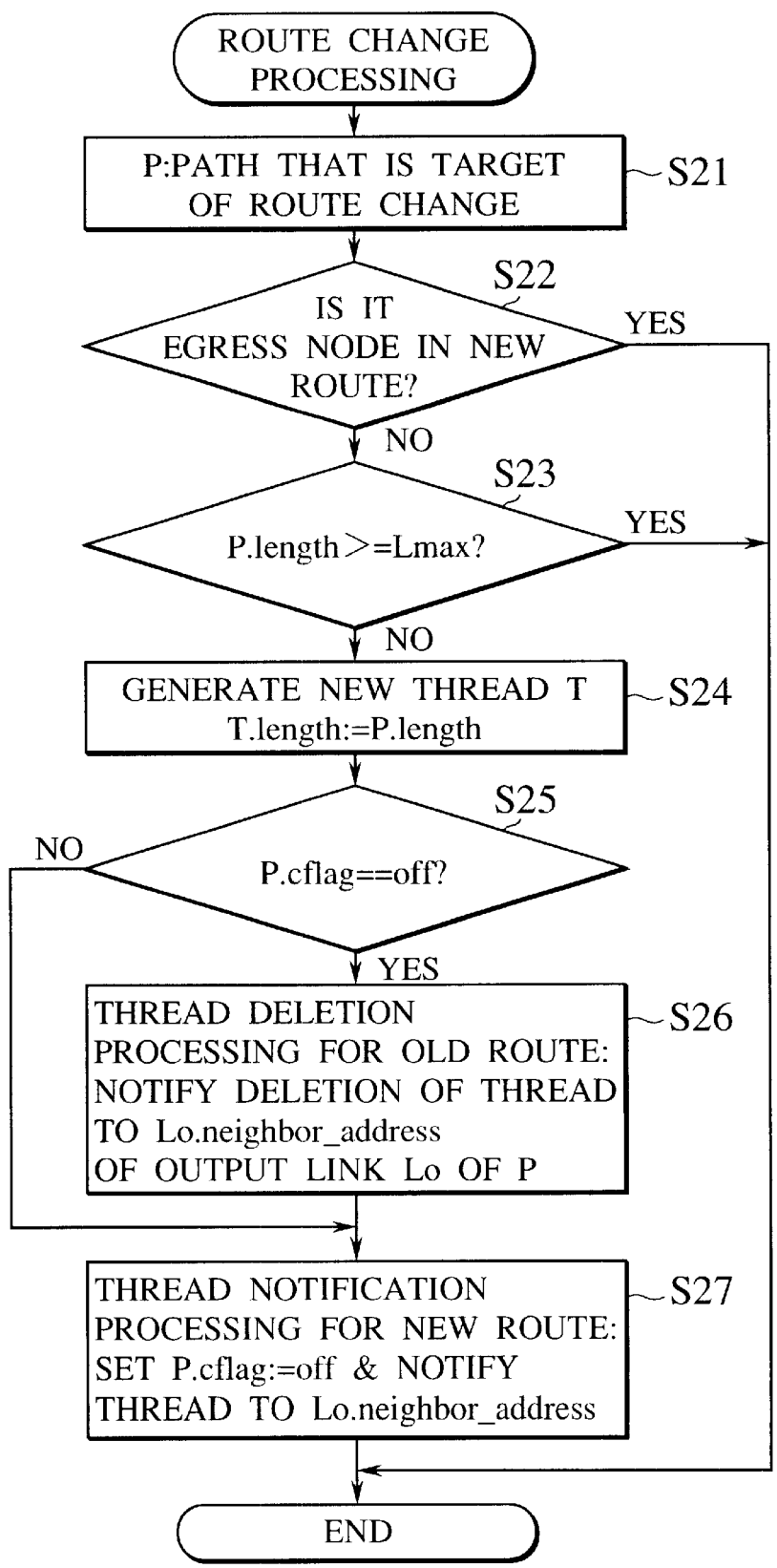
FIG. 19 is a flow chart of an exemplary operation of a node device according to one embodiment of the present invention at a time of route change occurrence.

Next, the processing procedure of the node device at which the route change occurred will be described. FIG. 19 shows a flow chart for an exemplary processing procedure of the node device at which the route change occurred. Here, an exemplary case of updating the path length without waiting for ACK for the thread will be described.

This processing is to be carried out with respect to each path having a flow identifier of a flow that is to be a target of the route change.

Initially, it is set that a path that is a target of the route change processing is denoted as P (step S21).

First, whether or not this node is the egress node on the new route after the route change is checked (step S22). If this node is the egress node, the processing is finished immediately.

If this node is not the egress node, whether or not the path length is greater than or equal to a threshold Lmax is checked (P.length>=Lmax?) (step S23), and if yes, the processing is finished immediately.

Otherwise, a new thread T is generated and the thread length is set equal to the path length (T.length:=P.length) (step S24).

Then, whether or not the confirmation flag of the path P is off is checked (P.cflag==off?) (step S25), and if yes, there is a thread that is waiting for ACK on the old route so that a thread deletion processing for the old route is carried out (step S26), and a thread notification processing for the new route is carried out (step S27).

In the thread deletion processing for the old route, the deletion of the thread is notified to the downstream side neighboring node Lo.neighbor_address of the output link Lo of the path P on the old route.

On the other hand, if the confirmation flag of the path P is on at the step S25, there is no thread that is waiting for ACK on the old route, so that nothing is done with respect to the old route and the thread notification processing for the new route is carried out (step S27).

In the thread notification processing for the new route, the confirmation flag of the path P is turned off (P.cflag:=off), and the thread is notified to the downstream side neighboring node Lo.neighbor_address of the output link Lo on the new route.

Figure 20:
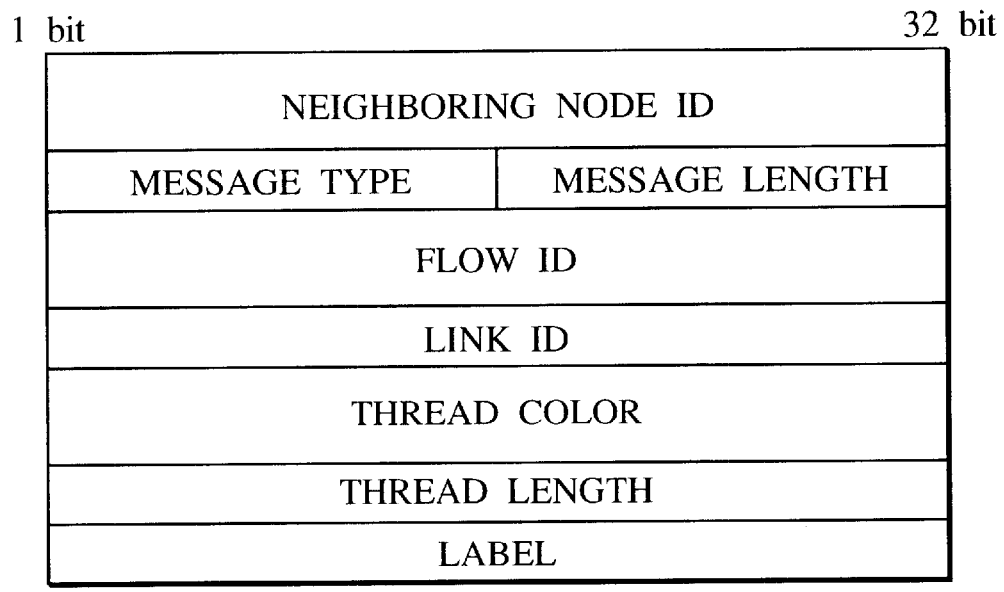
FIG. 20 is a diagram showing a format of a message exchanged among node devices for the purpose of loop detection according to one embodiment of the present invention.

Next, the format of the label delivery protocol message to be exchanged among nodes for the sake of the loop detection at the node device will be described. FIG. 20 shows an exemplary message format.

The meanings of fields constituting this message format of FIG. 20 are as follows.

A neighboring node identifier indicates an information regarding a message transmission node. As the neighboring node identifier, L3 address or [L3 address+ID locally allocated by the neighboring node (label space id)] can be used. When the L3 address is a router ID, the label space id specifies sharing or division or the label region among a plurality of interfaces of the same node or among a plurality of neighboring nodes connected to the same interface.

A message type describes a type of a message to be used by the label delivery protocol. The message type includes a label allocation request message (SETUP), a label release message (RELEASE), an update message (UPDATE), a cancel message, a label allocation success message (ACK), an update success message, and a trigger message.

A message length describes an entire length of fields subsequent to the message length field.

A flow identifier is an information for identifying a flow, and the flow identifier as described above (or that disclosed in the commonly assigned copending U.S. patent application Ser. No. 09/131,361) can be used, for example. The flow identifier comprises a flow type and a flow type specific flow definition. The flow identifier is contained at least in the label allocation request message.

A link identifier is an identifier that is unique within each interface of each node and used in order to distinguish a plurality of paths having the same flow identifier between the neighboring nodes. The label itself can be used as the link identifier.

A thread color and a thread length describe an information of a thread to be notified.

The thread color is specified by a set of an address of a node that generated the thread and a local ID locally allocated within the node. The node allocates the local ID such that the previously allocated value will not be used for the same flow. The simplest way of realizing such an allocation is to increment the local ID at the node every time the allocation is made.

The thread length indicates a hop count from the ingress node. Here, however, if the route is looping, the thread length is corrected at the node that generated the thread as described in the first concrete example.

A label is a value attached to a header of a packet that is to be label switched. It is notified to the neighboring node by the label allocation success message in the case of downstream on demand allocation, or by the label allocation request message in the case of upstream allocation or downstream allocation.

In the case of downstream on demand allocation or downstream allocation in which a thread flows through a path for which the label is not yet set up, the thread is transferred from the upstream to the downstream using the label allocation request message. In the case of upstream allocation, the thread is transferred from the upstream to the downstream using the label allocation success message. In the case where a thread flows through a path for which the label is already set up, the thread is transferred from the upstream to the downstream using the update message. In the case of releasing the label, the label release message is used, and the label release message may not include a thread field.

In the case of notifying the deletion of a thread, the cancel message is used. In the case where the cancel message flows through a path for which the label is not yet set up, the thread is deleted and the link is also deleted. In the case where the cancel message flows through a path for which the label is already set up, the thread is deleted but the link is not deleted.

In the case where ACK for the thread flows through a path for which the label is not yet set up, the label allocation success message is used. In the case where ACK for the thread flows through a path for which the label is already set up, the update success message is used. The label allocation success message and the update success message may not contain the thread information.

The trigger message is used in the case of generating a path by the initiative of the egress node, in order to notify the path set up request to the downstream side neighboring node on the new route at the route changing node.

In summary, the present invention provides a method for setting up a label switched path, in which whether the label switched path forms a loop or not is judged at a node that received a request message (such as SETUP, UPDATE) regarding a label switched path set up for a packet flow, on a basis of label switched path information stored in a first mode at the node that received the request message, where the request message includes a flow identifier for identifying the packet flow (which can be replaced by a link identifier in the case of UPDATE) and information (such as thread) indicating that it is a message currently awaiting a response (such as ACK) regarding the packet flow, and the first mode indicates that a message from which the label switched path information originates is a message currently awaiting a response. Then, the flow identifier contained in the request message is stored as the label switched path information in the first mode at the node device that received the request message (by turning the confirmation flag off, for example), and the request message is transferred from the node that received the request message to another node on a route of the packet flow, when the node that received the request message cannot judge that the label switched path does not form a loop. Also, a response message for the request message is returned from the node that received the request message when the node that received the request message judges that the label switched path does not form a loop.

Then, the label switched path information currently stored in the first mode at a node that received the response message is changed into a second mode different from the first mode (by turning the confirmation flag on, for example), such that the label switched path information that is changed into the second mode will not be used subsequently in judging whether any requested label switched path forms a loop or not at the node that received the response message and the label switched path will become available at the node that received the response message.

In this way, the label switched path set up request message is transferred up to a node that can confirm that the path does not form a loop, while each node through which the message passes stores the fact that it is in a message processing state. Then, in a process where a response message is returned from that node, the message processing state of each node on the route of the path is released sequentially, and this releasing establishes the path set up, so that it suffices to make the judgement as to whether or not a loop is formed only with respect to a message (thread) for which the message processing state is currently stored, by ignoring the other messages for which the message processing state is currently not stored. Consequently, the amount of checking for the loop detection can be reduced and therefore the loop detection can be realized more easily.

In addition, at a time of the route change, the old path is already established (and hence not a subject of the loop judgement), so that even a case where the new path and the old path collide will not be erroneously judged as a loop. Consequently, it is also possible to continue to send packets through the old path until the new path is established, and it is also possible to continue to utilize the link information at a portion which is shared by the new path and the old path.

In this method, the response message may be conditionally transferred from the node that received the response message to another node that transferred the request message and currently stores the label switched path information in the first mode.

Also, in this method, the node that received the request message may not carry out transfer of the request message or returning of the response message when the node that received the request message judges that the label switched path forms a loop.

Also, in this method, the node that received the request message can judge whether the label switched path forms a loop or not, according to whether or not the label switched path information containing the flow identifier that is identical to that contained in the request message is stored in the first mode at the node that received the request message.

Also, in this method, the request message may also contain a message identifier for network globally identifying each message that is being processed for the packet flow, and the node device that received the request message can store the label switched path information containing the message identifier and the flow identifier.

In this case, the node that received the request message can judge whether the label switched path forms a loop or not, according to whether or not the label switched path information containing the flow identifier and the message identifier that are identical to those contained in the request message is stored in the first mode at the node that received the request message. Here, it is possible to make this judgement also according to whether or not a newly received message and a message that is previously received and currently being processed are related to different input side links.

Also, in this case, the message identifier may contain an identification information of a node (proxy ingress node, for example) that allocated the message identifier contained in the request message.

Also, in this method, the request message may contain another information (thread length, for example) from which a number of hops from an ingress node of the label switched path up to the node that received the request message can be obtained, and the node that received the request message can handle the request message equivalently as in a case of judging that the label switched path forms a loop, when the number of hops is judged as exceeding a prescribed value according to that another information.

Also, in this method, the node that received the request message can judge that the label switched path does not form a loop, when own node is an egress node of the label switched path or when a corresponding established label switched path exists on a downstream side of own node and it is allowed to connect the label switched path to that corresponding established label switched path (the case where the thread length is less than or equal to the path length of the established label switched path, for example).

Also, in this method, the request message can be actively transmitted by an ingress node of the label switched path, an intermediate node of an already established label switched path at which a route change occurred, or an egress node of an already established label switched path that newly recognized a downstream side neighboring node.

Also, in this method, the node that received the request message may also carry out allocation of a label contained in a link information provided for label switching purpose, at a time of returning the response message.

In this way, it becomes possible to allocate labels to be actually used for the switching after confirming that it is possible to set up a loopless label switched path end-to-end so that it is possible to save the label resources.

Also, in this method, a cancellation message (the thread deletion notice, for example) for the request message may be transmitted from a node that actively transmitted the request message, when the node that received the request message has judged that the label switched path forms a loop and a need to set up the label switched path no longer exists (in the case where the corresponding input side link information is deleted or the case there the route change occurred, for example), and the flow identifier contained in the request message as stored in the first mode at each node that transferred the request message can be maintained until the cancellation message corresponding to the request message is received.

In this way, it becomes possible to prevent the unnecessary label allocation so that it is possible to save the label resources.

Also, in this method, when the node that received the request message currently stores the label switched path information corresponding to another request message regarding the label switched path set up in the first mode and the node that received the request message cannot judge whether the label switched path forms a loop or not, the node that received the request message can handle the request message and that another request message together as a single message.

For example, in the case where the request message contains an information regarding the a number of hops from an ingress node of the label switched path up to the node that received the request message, the identifier of the message for which this hop count is larger is used as the message identifier of that single message. Then, when this newly determined message identifier (and the hop count) is different from that of the already transferred message (that is currently being processed), this change is notified to nodes on the route of the path. In this way, the number of messages and thereby the number of message processing states can be reduced.

Also, in this method, the request message may contain another information from which a number of hops from an ingress node of the label switched path up to the node that received the request message can be obtained, and the node that received the request message can correct that another information regarding the number of hops from the ingress node of the label switched path up to own node, when the node that received the request message judges that the label switched path forms a loop.

For example, by updating the hop count to a special value <unknown>, it becomes possible to prevent the hop count from being in an erroneously incremented state when a message that has been maintained in the message processing state due to loop is to be used later on.

Next, an exemplary configuration of the node device according to the present invention will be described with references to FIG. 21 and FIG. 22.

Figure 21:
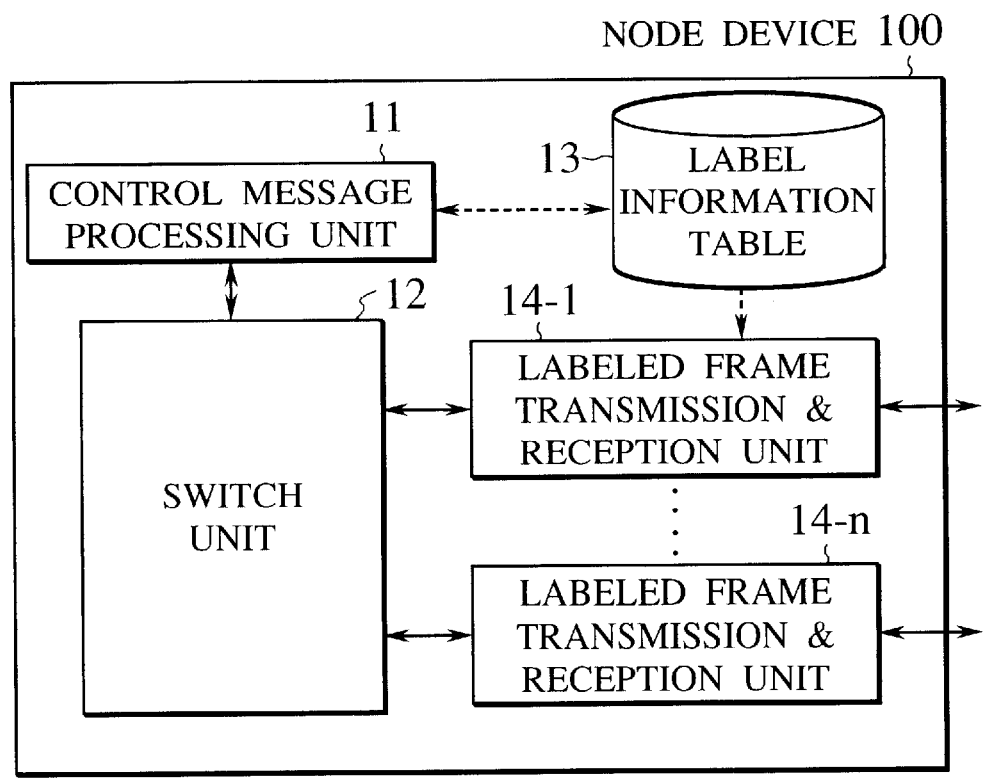
FIG. 21 is a block diagram showing an exemplary configuration of a node device according to one embodiment of the present invention.

The node device 100 of FIG. 21 comprises a control message processing unit 11, a switch unit 12, a label information table 13, and a plurality of labelled frame transmission and reception units 14-1 to 14-n.

In this node device 100, the labelled frames are entered from external devices, switched at the switch unit 12, and then outputted to the external devices.

Each labelled frame transmission and reception unit 14 enters the labelled frame from the external device or the switch unit 12, refers to the label value written in the header of the frame, and if necessary, carries out the rewriting of the header of the labelled frame and the attaching/removing of an internal header which is necessary in switching frames at the switch unit 12, according to the label information stored in the label information table 13, and then outputs the labelled frame to the switch unit 12 or the external device.

The switch unit 12 is a unit for switching and outputting the labelled frame received from one labelled frame transmission and reception unit 14 to another labelled frame transmission and reception unit 14 or the control message processing unit 11 according to the internal header information.

The control message processing unit 11 carries the protocol message processing used for the purpose of the label allocation/release and the label switched path loop detection, as well as reading/writing of information with respect to the label information table according to the need.

The label information table 13 stores the flow table containing information on the input side label and the output side label.

FIG. 22 shows a detail configuration of the control message processing unit 11, which comprises a request message receiving unit 11a, a loop judging unit 11b, a processing unit 11c, a response message receiving unit 11d, and a message transfer unit 11e.

The loop judging unit 11b judges whether the label switched path forms a loop or not upon receiving a request message regarding the label switched path set up for a packet flow through the request message receiving unit 11a, on a basis of label switched path information stored in a first mode at the label information table 13, where the request message includes a flow identifier for identifying the packet flow and information indicating that it is a message currently awaiting a response regarding the packet flow, and the first mode indicates that a message from which the label switched path information originates is a message currently awaiting a response.

The processing unit 11c stores the flow identifier contained in the request message as the label switched path information in the first mode at the label information table 13 and transfers the request message to another node on a route of the packet flow through the message transfer unit 11e, when the loop judging unit 11b cannot judge that the label switched path does not form a loop, and returns a response message for the request message through the message transfer unit 11e when the loop judging unit 11b judges that the label switched path does not form a loop.

The processing unit 11c also changes the label switched path information currently stored in the first mode at the label information table 13 into a second mode different from the first mode upon receiving the response message through the response message receiving unit 11d, such that the label switched path information that is changed into the second mode will not be used subsequently in judging whether any requested label switched path forms a loop or not at this node device and the label switched path will become available at this node device.

As described, according to the present invention, there is no need for the retry mechanism for the purpose of loop prevention, and the updating of one thread can be executed without waiting for ACK at each occasion of updating, so that it is possible to realize the fast path set up.

Also, threads can be merged so that it is possible to reduce the number of messages required for the purpose of loop prevention, and the message length is bounded at a certain value and does not increase even when the path length increases unlike the path vector scheme so that it is possible to save the network resources.

Also, when the new route is looping at a time of the route change, it is possible to continue to use a path on the old route. In addition, while there is a loop, the label allocation is not carried out at the node that is notifying the thread, so that it is possible to save the label resources. Moreover, packets of the flow for which the label allocation is not carried out can be discarded at the proxy ingress node so that the network resources can also be saved.

Also, even if the thread information is lost during the thread notification due to the breakdown of the intermediate node or link, the thread transfer deadlock or the thread information contradiction can be prevented when the label delivery protocol automatically detects a disconnection of a session with the neighboring node, so that it is possible to provide a robust loop prevention mechanism.

Furthermore, there is no need to store the thread color once the path is set up, so that it is possible to reduce the amount of information to be stored while the network is in stationary state.

It is to be noted that the above description presupposes the hard state type protocol in which the label allocation message is not transmitted to the path to which the label is allocated once, but the present invention is also effective for the soft state type protocol in which the label allocation message is transmitted regularly even for the path to which the label is allocated once. In the case of the soft state type protocol, the label is released when the label allocation message is not received for a prescribed period of time.

It is also to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the node device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for setting up a label switched path, comprising the steps of:

judging whether the label switched path forms a loop or not at a node that received a request message regarding a set up of the label switched path for a packet flow, on a basis of label switched path information stored in a first mode at said node that received the request message, the request message including a flow identifier for identifying the packet flow and information indicating that it is a message currently awaiting a response regarding the packet flow, and the first mode indicating that a message from which the label switched path information originates is a message currently awaiting a response;

storing the flow identifier contained in the request message as the label switched path information in the first mode at said node that received the request message, and transferring the request message from said node that received the request message to another node on a route of the packet flow, when said node that received the request message cannot judge that the label switched path does not form a loop;

returning a response message for the request message from said node that received the request message when said node that received the request message judges that the label switched path does not form a loop; and changing the label switched path information currently stored in the first mode at a node that received the response message into a second mode different from the first mode such that the label switched path information that is changed into the second mode will not be used subsequently in judging whether any requested label switched path forms a loop or not at said node that received the response message and the label switched path will become available at said node that received the response message.

2. The method of claim 1, further comprising the step of:

conditionally transferring the response message from the node that received the response message to another node that transferred the request message and currently stores the label switched path information in the first mode.

3. The method of claim 1, wherein said node that received the request message does not carry out transfer of the request message or returning of the response message when said node that received the request message judges that the label switched path forms a loop.

4. The method of claim 1, wherein said node that received the request message judges whether the label switched path forms a loop or not, according to whether or not the label switched path information containing the flow identifier that is identical to that contained in the request message is stored in the first mode at said node that received the request message.

5. The method of claim 1, wherein the request message also contains a message identifier for network globally identifying each message that is being processed for the packet flow, and said node device that received the request message stores the label switched path information containing the message identifier and the flow identifier.

6. The method of claim 5, wherein said node that received the request message judges whether the label switched path forms a loop or not, according to whether or not the label switched path information containing the flow identifier and the message identifier that are identical to those contained in the request message is stored in the first mode at said node that received the request message.

7. The method of claim 5, wherein the message identifier contains an identification information of a node that allocated the message identifier contained in the request message.

8. The method of claim 1, wherein the request message contains another information from which a number of hops from an ingress node of the label switched path up to said node that received the request message can be obtained, and
said node that received the request message handles the request message equivalently as in a case of judging that the label switched path forms a loop, when the number of hops is judged as exceeding a prescribed value according to said another information.

9. The method of claim 1, wherein said node that received the request message judges that the label switched path does not form a loop, when own node is an egress node of the label switched path or when a corresponding established label switched path exists on a downstream side of own node and it is allowed to connect the label switched path to said corresponding established label switched path.

10. The method of claim 1, wherein the request message is actively transmitted by an ingress node of the label switched path, an intermediate node of an already established label switched path at which a route change occurred, or an egress node of an already established label switched path that newly recognized a downstream side neighboring node.

11. The method of claim 1, wherein said node that received the request message also carries out allocation of a label contained in a link information provided for label switching purpose, at a time of returning the response message.

12. The method of claim 1, further comprising the steps of:
transmitting a cancellation message for the request message from a node that actively transmitted the request message, when said node that received the request message has judged that the label switched path forms a loop and a need to set up the label switched path no longer exists, and
maintaining the flow identifier contained in the request message as stored in the first mode at each node that transferred the request message, until the cancellation message corresponding to the request message is received.

13. The method of claim 1, wherein when said node that received the request message currently stores the label switched path information corresponding to another request message regarding the label switched path set up in the first mode and said node that received the request message cannot judge whether the label switched path forms a loop or not, said node that received the request message handles the request message and said another request message together as a single message.

14. The method of claim 1, wherein the request message contains another information from which a number of hops from an ingress node of the label switched path up to said node that received the request message can be obtained, and
said node that received the request message corrects said another information regarding the number of hops from the ingress node of the label switched path up to own node, when said node that received the request message judges that the label switched path forms a loop.

15. A node device for setting up a label switched path, comprising:
a judging unit configured to judge whether the label switched path forms a loop or not upon receiving a request message regarding the label switched path set up for a packet flow, on a basis of label switched path information stored in a first mode at a memory of said node device, the request message including a flow identifier for identifying the packet flow and information indicating that it is a message currently awaiting a response regarding the packet flow, and the first mode indicating that a message from which the label switched path information originates is a message currently awaiting a response;
a first processing unit configured to store the flow identifier contained in the request message as the label switched path information in the first mode at the memory and transfer the request message to another node on a route of the packet flow, when the judging unit cannot judge that the label switched path does not form a loop, and to return a response message for the request message when the judging unit judges that the label switched path does not form a loop; and
a second processing unit configured to change the label switched path information currently stored in the first mode at the memory into a second mode different from the first mode upon receiving the response message, such that the label switched path information that is changed into the second mode will not be used subsequently in judging whether any requested label switched path forms a loop or not at said node device and the label switched path will become available at said node device.

16. The node device of claim 15, wherein the second processing unit is also configured to conditionally transfer the response message to another node that transferred the request message and currently stores the label switched path information in the first mode.

17. The node device of claim 15, wherein the first processing unit does not carry out transfer of the request message or returning of the response message when the judging unit judges that the label switched path forms a loop.

18. The node device of claim 15, wherein the judging unit judges whether the label switched path forms a loop or not, according to whether or not the label switched path information containing the flow identifier that is identical to that contained in the request message is stored in the first mode at the memory.

19. The node device of claim 15, wherein the request message also contains a message identifier for network globally identifying each message that is being processed for the packet flow, and the first processing unit stores the label switched path information containing the message identifier and the flow identifier.

20. The node device of claim 19, wherein the judging unit judges whether the label switched path forms a loop or not, according to whether or not the label switched path information containing the flow identifier and the message identifier that are identical to those contained in the request message is stored in the first mode at the memory.

21. The node device of claim 15, wherein the judging unit judges that the label switched path does not form a loop, when said node device is an egress node of the label switched path or when a corresponding established label switched path exists on a downstream side of said node device and it is allowed to connect the label switched path to said corresponding established label switched path.

22. The node device of claim 15, further comprising:
 a transfer unit for actively transmitting a new request message when said node device is an ingress node of the label switched path, an intermediate node of an already established label switched path at which a route change occurred, or an egress node of an already established label switched path that newly recognized a downstream side neighboring node.

23. The node device of claim 15, wherein when the first processing unit currently stores the label switched path information corresponding to another request message for regarding the label switched path set up in the first mode at the memory and the judging unit cannot judge whether the label switched path forms a loop or not, said node device handles the request message and said another request message together as a single message.

24. A computer usable medium having computer readable program code means embodied therein for causing a computer to function as a node device for setting up a label switched path, the computer readable program code means includes:

first computer readable program code means for causing said computer to judge whether the label switched path forms a loop or not upon receiving a request message regarding the label switched path set up for a packet flow, on a basis of label switched path information stored in a first mode at a memory of said node device, the request message including a flow identifier for identifying the packet flow and information indicating that it is a message currently awaiting a response regarding the packet flow, and the first mode indicating that a message from which the label switched path information originates is a message currently awaiting a response;

second computer readable program code means for causing said computer to store the flow identifier contained in the request message as the label switched path information in the first mode at the memory and transfer the request message to another node on a route of the packet flow, when the first computer readable program code means cannot judge that the label switched path does not form a loop, and to return a response message for the request message when the first computer readable program code means judges that the label switched path does not form a loop; and third computer readable program code means for causing said computer to change the label switched path information currently stored in the first mode at the memory into a second mode different from the first mode upon receiving the response message, such that the label switched path information that is changed into the second mode will not be used subsequently in judging whether any requested label switched path forms a loop or not at said node device and the label switched path will become available at said node device.

\* \* \* \* \*